United States Patent
Tsuji et al.

(10) Patent No.: US 11,785,410 B2
(45) Date of Patent: Oct. 10, 2023

(54) REPRODUCTION APPARATUS AND REPRODUCTION METHOD

(71) Applicant: SONY GROUP CORPORATION, Tokyo (JP)

(72) Inventors: Minoru Tsuji, Chiba (JP); Toru Chinen, Kanagawa (JP); Mitsuhiro Hirabayashi, Tokyo (JP); Keiichi Aoyama, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/590,188

(22) Filed: Feb. 1, 2022

(65) Prior Publication Data

US 2022/0159400 A1 May 19, 2022

Related U.S. Application Data

(62) Division of application No. 16/340,791, filed as application No. PCT/JP2017/040617 on Nov. 10, 2017, now Pat. No. 11,259,135.

(30) Foreign Application Priority Data

Nov. 25, 2016 (JP) ................................ 2016-228598
Mar. 28, 2017 (JP) ................................ 2017-062303

(51) Int. Cl.
*H04N 9/80* (2006.01)
*H04S 7/00* (2006.01)
(Continued)

(52) U.S. Cl.
CPC ............... *H04S 7/302* (2013.01); *H04N 9/87* (2013.01); *H04S 2400/11* (2013.01)

(58) Field of Classification Search
USPC ........................................................ 386/201
See application file for complete search history.

(56) References Cited

U.S. PATENT DOCUMENTS 5,714,997 A 2/1998 Anderson
6,919,892 B1 * 7/2005 Cheiky .................. G06T 13/40
348/E5.022
(Continued)

FOREIGN PATENT DOCUMENTS

AU 4649496 A 7/1996
CN 1672463 A 9/2005
(Continued)

OTHER PUBLICATIONS

International Search Report and Written Opinion of PCT Application No. PCT/JP2017/040617, dated Feb. 6, 2018, 08 pages of English Translation and 07 pages of ISRWO.
(Continued)

*Primary Examiner* — Nigar Chowdhury
(74) *Attorney, Agent, or Firm* — CHIP LAW GROUP

(57) ABSTRACT

The present technology relates a reproduction apparatus, a reproduction method, an information processing apparatus, an information processing method, and a program which can realize reproduction of highly flexible audio data while reflecting the intention of a content creator.
A reproduction apparatus according to one aspect of the present technology acquires content including audio data of each of audio objects and rendering parameters of the audio data for each of a plurality of presumed listening positions, renders the audio data on the basis of the rendering parameters for a selected predetermined presumed listening position, and outputs an audio signal. The present technology can be applied to an apparatus that can reproduce object-based audio data.

11 Claims, 39 Drawing Sheets

| # | AUDIO OBJECT |
|---|---|
| 1 | MAIN GUITAR |
| 2 | SIDE GUITAR |
| 3 | BASS |
| 4 | DRUMS |
| 5 | COMMENTARY VOICE |

| # | VIEWPOINT |
|---|---|
| 1 | ENTIRE BAND |
| 2 | ONLY MAIN GUITAR |
| 3 | CLOSE-UP OF LEFT HAND FOR MAIN GUITAR |
| 4 | CLOSE-UP OF RIGHT HAND FOR MAIN GUITAR |
| 5 | VIEWPOINT OF MAIN GUITAR PLAYER |

(51) Int. Cl.
*H04N 9/87* (2006.01)
*H04N 5/93* (2006.01)
*G11B 27/00* (2006.01)

(56) References Cited

U.S. PATENT DOCUMENTS

| | | | |
|---|---|---|---|
| 7,526,790 B1 | 4/2009 | Vesikivi | |
| 9,640,158 B1 | 5/2017 | Baker et al. | |
| 9,769,585 B1 | 9/2017 | Hills | |
| 9,900,720 B2 | 2/2018 | Grant et al. | |
| 10,085,107 B2 | 9/2018 | Suenaga | |
| 2003/0007648 A1* | 1/2003 | Currell | G10K 15/08 381/63 |
| 2003/0110027 A1* | 6/2003 | Mittal | G06T 9/005 704/219 |
| 2003/0203717 A1* | 10/2003 | Chuprun | H04B 7/18591 455/12.1 |
| 2006/0247918 A1 | 11/2006 | Schmidt et al. | |
| 2010/0080396 A1 | 4/2010 | Aoyagi | |
| 2012/0170756 A1 | 7/2012 | Kraemer et al. | |
| 2013/0329922 A1 | 12/2013 | Lemieux et al. | |
| 2014/0126758 A1 | 5/2014 | Van Der Wijst | |
| 2014/0133683 A1 | 5/2014 | Robinson et al. | |
| 2014/0270263 A1 | 9/2014 | Fejzo et al. | |
| 2015/0124999 A1 | 5/2015 | Ren et al. | |
| 2015/0221319 A1 | 8/2015 | Cartwright et al. | |
| 2015/0223002 A1 | 8/2015 | Mehta et al. | |
| 2016/0111099 A1 | 4/2016 | Hirvonen et al. | |
| 2016/0155447 A1 | 6/2016 | Klejsa et al. | |
| 2016/0210972 A1 | 7/2016 | Nurmukhanov et al. | |
| 2016/0212501 A1 | 7/2016 | Master et al. | |
| 2016/0212563 A1 | 7/2016 | Yuyama et al. | |
| 2016/0227338 A1 | 8/2016 | Oh et al. | |
| 2016/0266865 A1 | 9/2016 | Tsingos et al. | |
| 2016/0286333 A1 | 9/2016 | Robinson et al. | |
| 2016/0295343 A1 | 10/2016 | Tsingos et al. | |
| 2016/0300596 A1 | 10/2016 | Ransdell et al. | |
| 2016/0330562 A1 | 11/2016 | Crockett | |
| 2016/0337777 A1 | 11/2016 | Tsuji et al. | |
| 2017/0086008 A1 | 3/2017 | Robinson | |
| 2017/0094440 A1 | 3/2017 | Brown et al. | |
| 2017/0293461 A1 | 10/2017 | McCauley et al. | |
| 2017/0301330 A1 | 10/2017 | Fejzo et al. | |
| 2017/0374465 A1 | 12/2017 | Family et al. | |
| 2018/0061107 A1 | 3/2018 | Anderson et al. | |
| 2018/0109900 A1 | 4/2018 | Lyren et al. | |
| 2018/0139565 A1 | 5/2018 | Norris et al. | |

FOREIGN PATENT DOCUMENTS

| | | |
|---|---|---|
| CN | 101521843 A | 9/2009 |
| CN | 104604253 A | 5/2015 |
| CN | 105075117 A | 11/2015 |
| EP | 2724556 A2 | 4/2014 |
| EP | 2974010 A1 | 1/2016 |
| HK | 1214039 A1 | 7/2016 |
| JP | 2011-138151 A | 7/2011 |
| JP | 2014-520491 A | 8/2014 |
| JP | 2016-134769 A | 7/2016 |
| JP | 2016-523001 A | 8/2016 |
| JP | 6484605 B2 | 3/2019 |
| KR | 10-2015-0005431 A | 1/2015 |
| KR | 10-2015-0131268 A | 11/2015 |
| NL | 2006997 C2 | 1/2013 |
| TW | 200638338 A | 11/2006 |
| WO | 96/21321 A1 | 7/1996 |
| WO | 2006/118590 A1 | 11/2006 |
| WO | 2012/177139 A2 | 12/2012 |
| WO | 2014/151092 A1 | 9/2014 |
| WO | 2015/073454 A2 | 5/2015 |
| WO | 2015/107926 A1 | 7/2015 |

OTHER PUBLICATIONS

International Preliminary Report on Patentability of PCT Application No. PCT/JP2017/040617, dated Jun. 6, 2019, 09 pages of English Translation and 05 pages of IPRP.
Non-Final Office Action for U.S. Appl. No. 16/340,791, dated Apr. 12, 2021, 15 pages.
Notice of Allowance for U.S. Appl. No. 16/340,791, dated Oct. 14, 2021, 10 pages.
Notice of Allowance for U.S. Appl. No. 16/340,791, dated Nov. 4, 2021, 02 pages.
Notice of Allowance for U.S. Appl. No. 16/340,791, dated Dec. 17, 2021, 02 pages.
Notice of Allowance for U.S. Appl. No. 16/340,791, dated Jan. 5, 2022, 02 pages.
Ville Pulkki, "Virtual Sound Source Positioning Using Vector Base Amplitude Panning", Journal of the Audio Engineering Society, vol. 45 Issue 6, Jun. 1997, pp. 456-466.
"Information technology—High efficiency coding and media delivery in heterogeneous environments—Part 3: 3D audio", ISO/IEC 23008-3:2015(E), Oct. 2015, 439 pages.
Office Action for CN Patent Application No. 201780071306.8, dated Oct. 11, 2021, 07 pages of English Translation and 05 pages of Office Action.
Deleforge, et al., "Co-Localization of Audio Sources in Images Using Binaural Features and Locally-Linear Regression", IEEE/ACM Transactions on Audio, Speech, and Language Processing, vol. 23, No. 4, Apr. 2015, pp. 718-731.
Zhang Chengyun, "Research on platform for virtual auditory environment real-time rendering system", A Dissertation Submitted for the Degree of Doctor of Philosophy, South China University of Technology, Guangzhou, China, Nov. 15, 2012, 124 pages.
Office Action for JP Patent Application No. 2018-552505, dated Aug. 24, 2021, 05 pages of English Translation and 06 pages of Office Action.
Extended European Search Report for EP Patent Application No. 17874691.3, dated Oct. 14, 2019, 11 pages.
Office Action for CN Patent Application No. 201780071306.8, dated Apr. 20, 2021, 22 pages of English Translation and 12 pages of Office Action.
Office Action for JP Patent Application No. 2021-167855, dated Aug. 23, 2022, 04 pages of English Translation and 05 pages of Office Action.

* cited by examiner

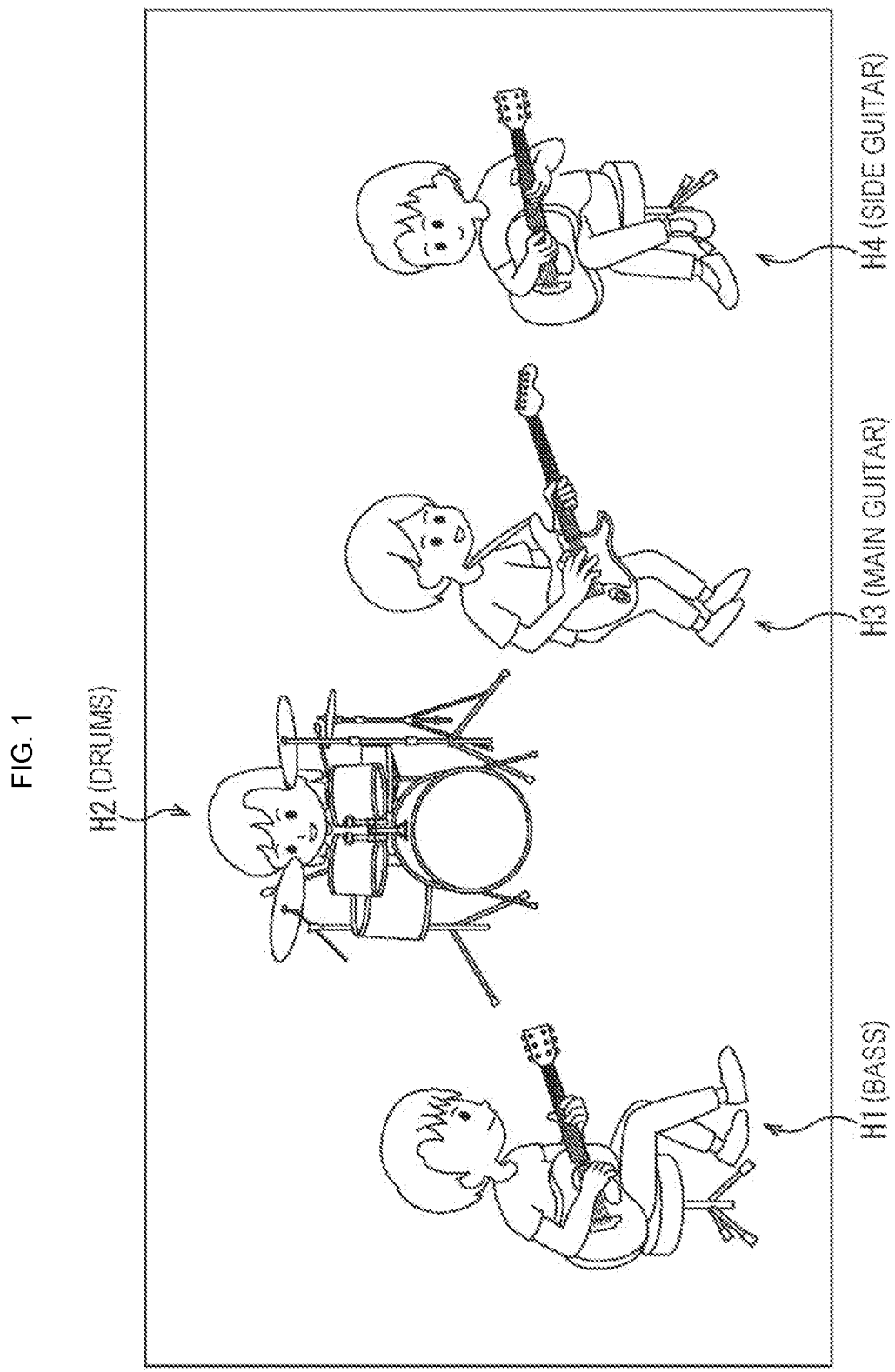

FIG. 2A

| # | AUDIO OBJECT |
|---|---|
| 1 | MAIN GUITAR |
| 2 | SIDE GUITAR |
| 3 | BASS |
| 4 | DRUMS |
| 5 | COMMENTARY VOICE |

FIG. 2B

| # | VIEWPOINT |
|---|---|
| 1 | ENTIRE BAND |
| 2 | ONLY MAIN GUITAR |
| 3 | CLOSE-UP OF LEFT HAND FOR MAIN GUITAR |
| 4 | CLOSE-UP OF RIGHT HAND FOR MAIN GUITAR |
| 5 | VIEWPOINT OF MAIN GUITAR PLAYER |

FIG. 3

| OBJECT | RENDERING PARAMETER | | VIEWPOINT #1 VALUE |
|---|---|---|---|
| MAIN GUITAR | LOCALIZATION INFORMATION | Azimuth[°] | −10 |
| | | Elevation[°] | 0 |
| | GAIN INFORMATION | | 1.0 |
| SIDE GUITAR | LOCALIZATION INFORMATION | Azimuth[°] | −30 |
| | | Elevation[°] | 0 |
| | GAIN INFORMATION | | 1.0 |
| BASS | LOCALIZATION INFORMATION | Azimuth[°] | +30 |
| | | Elevation[°] | 0 |
| | GAIN INFORMATION | | 1.0 |
| DRUMS | LOCALIZATION INFORMATION | Azimuth[°] | +15 |
| | | Elevation[°] | 0 |
| | GAIN INFORMATION | | 1.0 |
| COMMENTARY VOICE | LOCALIZATION INFORMATION | Azimuth[°] | 0 |
| | | Elevation[°] | 0 |
| | GAIN INFORMATION | | 1.0 |

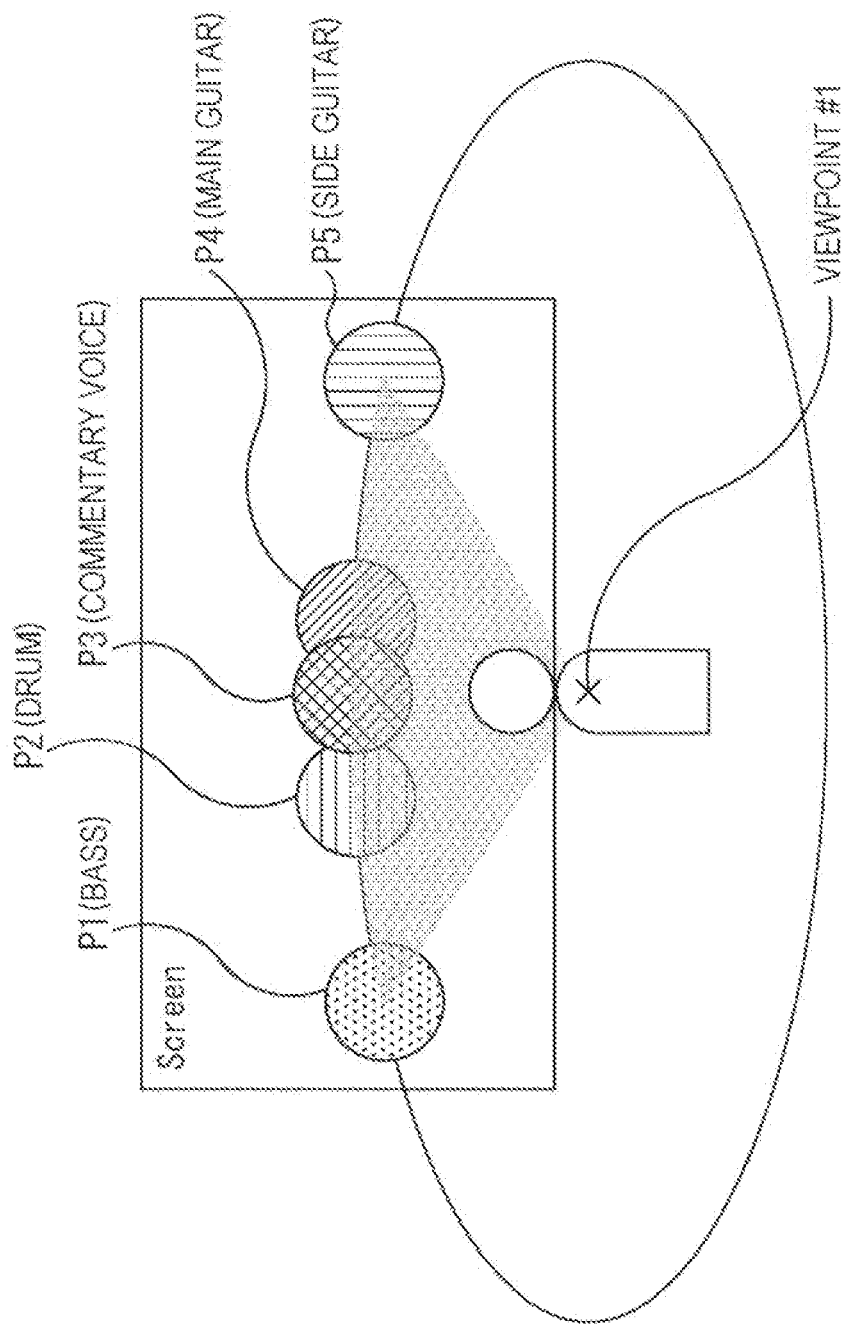

FIG. 5

| OBJECT | LEFT CHANNEL | RIGHT CHANNEL |
|---|---|---|
| MAIN GUITAR | 0.5 | 0.866 |
| SIDE GUITAR | 0.0 | 1.0 |
| BASS | 1.0 | 0.0 |
| DRUMS | 0.924 | 0.383 |
| COMMENTARY VOICE | 0.707 | 0.707 |

FIG. 6

| OBJECT | RENDERING PARAMETER | | VIEWPOINT #2 VALUE | VIEWPOINT #3 VALUE | VIEWPOINT #4 VALUE | VIEWPOINT #5 VALUE |
|---|---|---|---|---|---|---|
| MAIN GUITAR | LOCALIZATION INFORMATION | Azimuth[°] | 0 | 0 | 0 | 0 |
| | | Elevation[°] | 0 | 0 | 0 | 0 |
| | GAIN INFORMATION | | 1.0 | 1.0 | 1.0 | 0.5 |
| SIDE GUITAR | LOCALIZATION INFORMATION | Azimuth[°] | −30 | −30 | −30 | +30 |
| | | Elevation[°] | 0 | 0 | 0 | 0 |
| | GAIN INFORMATION | | 0.8 | 0.5 | 0.5 | 1.0 |
| BASS | LOCALIZATION INFORMATION | Azimuth[°] | +30 | +30 | +30 | −30 |
| | | Elevation[°] | 0 | 0 | 0 | 0 |
| | GAIN INFORMATION | | 0.8 | 0.5 | 0.5 | 1.0 |
| DRUMS | LOCALIZATION INFORMATION | Azimuth[°] | +15 | +15 | +15 | −15 |
| | | Elevation[°] | 0 | 0 | 0 | 0 |
| | GAIN INFORMATION | | 0.8 | 0.5 | 0.5 | 1.0 |
| COMMENTARY VOICE | LOCALIZATION INFORMATION | Azimuth[°] | 0 | 0 | 0 | 0 |
| | | Elevation[°] | 0 | 0 | 0 | 0 |
| | GAIN INFORMATION | | 1.0 | 1.0 | 1.0 | 1.0 |

FIG. 13

| RENDERING PARAMETER | |
|---|---|
| LOCALIZATION INFORMATION | Azimuth |
| | Elevation |
| GAIN INFORMATION | |
| EQUALIZER INFORMATION | TYPE OF FILTER |
| | CENTER FREQUENCY |
| | SHARPNESS |
| | GAIN |
| | PRE-GAIN |
| COMPRESSOR INFORMATION | FREQUENCY BANDWIDTH |
| | THRESHOLD |
| | RATIO |
| | GAIN |
| | ATTACK TIME |
| | RELEASE TIME |
| REVERB INFORMATION | INITIAL REFLECTION TIME |
| | INITIAL REFLECTION GAIN |
| | REVERBERATION TIME |
| | REVERBERATION GAIN |
| | Dumping |
| | Dry/Wet COEFFICIENT |

FIG. 15

| OBJECT | RENDERING PARAMETER | | VIEWPOINT #6 VALUE | VIEWPOINT #7 VALUE |
|---|---|---|---|---|
| MAIN GUITAR | LOCALIZATION INFORMATION | Azimuth[°] | −10 | −5 |
| | | Elevation[°] | 0 | 0 |
| | GAIN INFORMATION | | 1.0 | 1.0 |
| SIDE GUITAR | LOCALIZATION INFORMATION | Azimuth[°] | −30 | −10 |
| | | Elevation[°] | 0 | 0 |
| | GAIN INFORMATION | | 1.0 | 1.0 |
| BASS | LOCALIZATION INFORMATION | Azimuth[°] | +30 | +10 |
| | | Elevation[°] | 0 | 0 |
| | GAIN INFORMATION | | 1.0 | 1.0 |
| DRUMS | LOCALIZATION INFORMATION | Azimuth[°] | +15 | +8 |
| | | Elevation[°] | 0 | 0 |
| | GAIN INFORMATION | | 1.0 | 1.0 |
| COMMENTARY VOICE | LOCALIZATION INFORMATION | Azimuth[°] | 0 | 0 |
| | | Elevation[°] | 0 | 0 |
| | GAIN INFORMATION | | 1.0 | 1.0 |

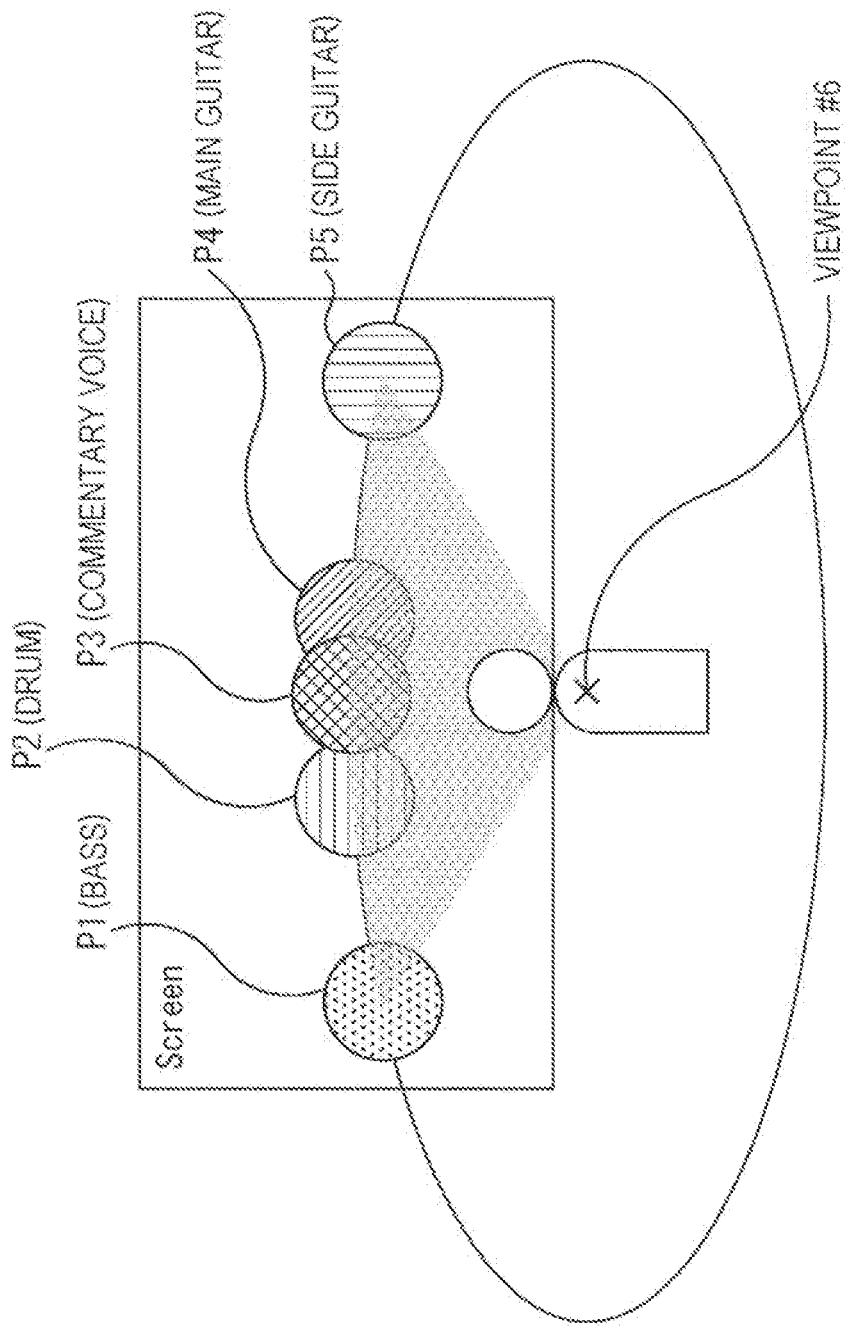

FIG. 18

| OBJECT | RENDERING PARAMETER | | VIEWPOINT #X VALUE |
|---|---|---|---|
| MAIN GUITAR | LOCALIZATION INFORMATION | Azimuth[°] | −7.5 |
| | | Elevation[°] | 0 |
| | GAIN INFORMATION | | 1.0 |
| SIDE GUITAR | LOCALIZATION INFORMATION | Azimuth[°] | −20 |
| | | Elevation[°] | 0 |
| | GAIN INFORMATION | | 1.0 |
| BASS | LOCALIZATION INFORMATION | Azimuth[°] | +20 |
| | | Elevation[°] | 0 |
| | GAIN INFORMATION | | 1.0 |
| DRUMS | LOCALIZATION INFORMATION | Azimuth[°] | +11.5 |
| | | Elevation[°] | 0 |
| | GAIN INFORMATION | | 1.0 |
| COMMENTARY VOICE | LOCALIZATION INFORMATION | Azimuth[°] | 0 |
| | | Elevation[°] | 0 |
| | GAIN INFORMATION | | 1.0 |

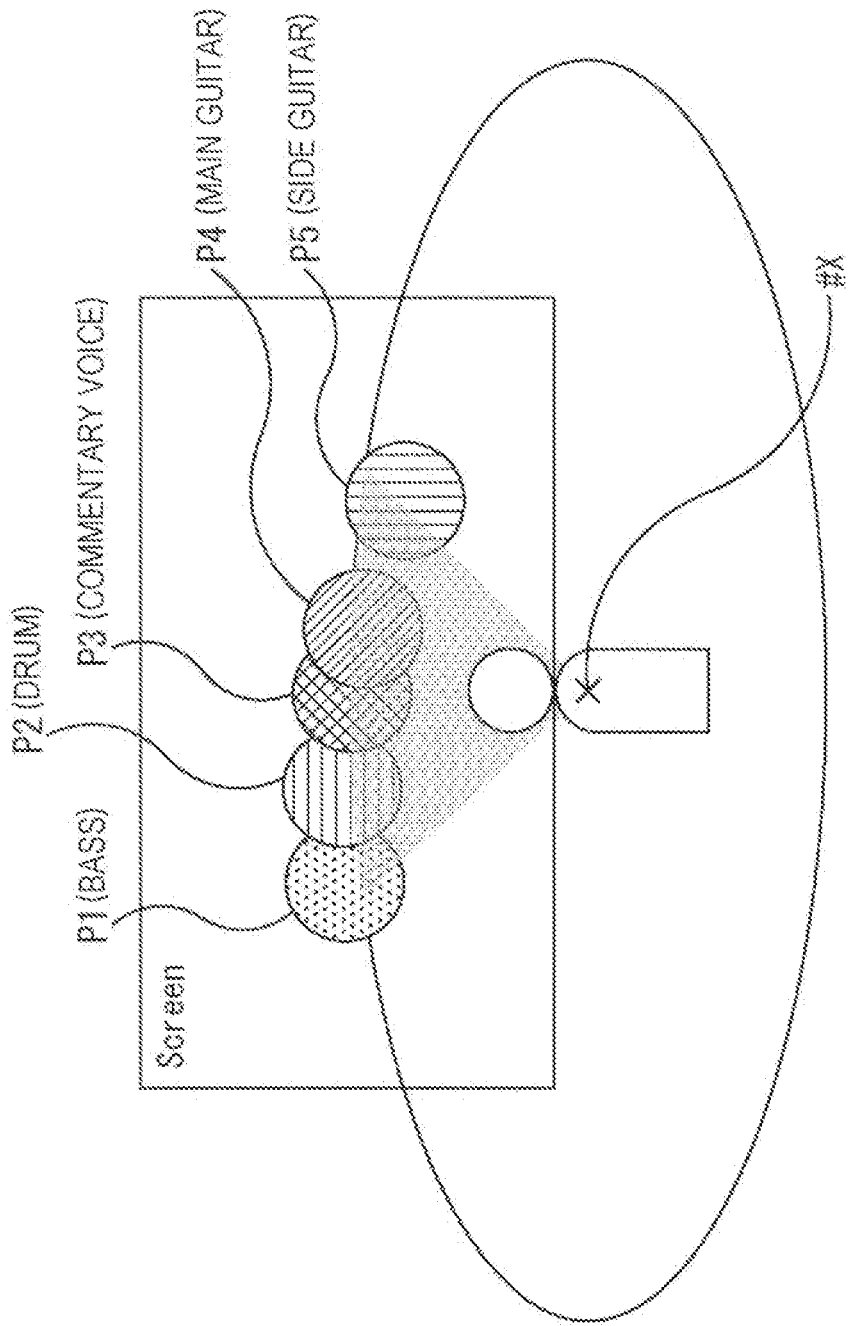

FIG. 30

| VIEWPOINT | PARAMETER INFORMATION | | | | RENDERING INFORMATION |
|---|---|---|---|---|---|
| | obj_type | obj_loc_x, obj_loc_y, obj_loc_z | lis_loc_x, lis_loc_y, lis_loc_z | date_time | |
| 1 | 0 | -20, 0, 0 | 0, 50, -1 | 2014.11.5.18.34.50 | r(0, -20, 0, 0, 0, 50, -1, 2014.11.5.18.34.50) |
| | 1 | 0, -10, 0 | 0, 50, -1 | 2014.11.5.18.34.50 | r(1, 0, -10, 0, 0, 50, -1, 2014.11.5.18.34.50) |
| | 2 | 20, 0, 0 | 0, 50, -1 | 2014.11.5.18.34.50 | r(2, 20, 0, 0, 0, 50, -1, 2014.11.5.18.34.50) |
| | 3 | 0, 10, 0 | 0, 50, -1 | 2014.11.5.18.34.50 | r(3, 0, 10, 0, 0, 50, -1, 2014.11.5.18.34.50) |
| 2 | 0 | -20, 0, 0 | -20, 30, -1 | 2014.11.5.18.34.50 | r(0, -20, 0, 0, -20, 30, -1, 2014.11.5.18.34.50) |
| | 1 | 0, -10, 0 | -20, 30, -1 | 2014.11.5.18.34.50 | r(1, 0, -10, 0, -20, 30, -1, 2014.11.5.18.34.50) |
| | 2 | 20, 0, 0 | -20, 30, -1 | 2014.11.5.18.34.50 | r(2, 20, 0, 0, -20, 30, -1, 2014.11.5.18.34.50) |
| | 3 | 0, 10, 0 | -20, 30, -1 | 2014.11.5.18.34.50 | r(3, 0, 10, 0, -20, 30, -1, 2014.11.5.18.34.50) |
| 3 | 0 | -20, 0, 0 | 20, 30, -1 | 2014.11.5.18.34.50 | r(0, -20, 0, 0, 20, 30, -1, 2014.11.5.18.34.50) |
| | 1 | 0, -10, 0 | 20, 30, -1 | 2014.11.5.18.34.50 | r(1, 0, -10, 0, 20, 30, -1, 2014.11.5.18.34.50) |
| | 2 | 20, 0, 0 | 20, 30, -1 | 2014.11.5.18.34.50 | r(2, 20, 0, 0, 20, 30, -1, 2014.11.5.18.34.50) |
| | 3 | 0, 10, 0 | 20, 30, -1 | 2014.11.5.18.34.50 | r(3, 0, 10, 0, 20, 30, -1, 2014.11.5.18.34.50) |

FIG. 31

| VIEWPOINT | PARAMETER INFORMATION | | | | RENDERING INFORMATION |
|---|---|---|---|---|---|
| | obj_type | obj_loc_x, obj_loc_y, obj_loc_z | lis_loc_x, lis_loc_y, lis_loc_z | date_time | |
| 4 | 0 | -20, 0, 0 | -20, 70, -1 | 2014.11.5.18.34.50 | r(0, -20, 0, 0, -20, 70, -1, 2014.11.5.18.34.50) |
| | 1 | 0, -10, 0 | -20, 70, -1 | 2014.11.5.18.34.50 | r(1, 0, -10, 0, -20, 70, -1, 2014.11.5.18.34.50) |
| | 2 | 20, 0, 0 | -20, 70, -1 | 2014.11.5.18.34.50 | r(2, 20, 0, 0, -20, 70, -1, 2014.11.5.18.34.50) |
| | 3 | 0, 10, 0 | -20, 70, -1 | 2014.11.5.18.34.50 | r(3, 0, 10, 0, -20, 70, -1, 2014.11.5.18.34.50) |
| 5 | 0 | -20, 0, 0 | 20, 70, -1 | 2014.11.5.18.34.50 | r(0, -20, 0, 0, 20, 70, -1, 2014.11.5.18.34.50) |
| | 1 | 0, -10, 0 | 20, 70, -1 | 2014.11.5.18.34.50 | r(1, 0, -10, 0, 20, 70, -1, 2014.11.5.18.34.50) |
| | 2 | 20, 0, 0 | 20, 70, -1 | 2014.11.5.18.34.50 | r(2, 20, 0, 0, 20, 70, -1, 2014.11.5.18.34.50) |
| | 3 | 0, 10, 0 | 20, 70, -1 | 2014.11.5.18.34.50 | r(3, 0, 10, 0, 20, 70, -1, 2014.11.5.18.34.50) |

FIG. 34

| VIEWPOINT | PARAMETER INFORMATION ||||| RENDERING INFORMATION |
|---|---|---|---|---|---|
| | obj_type | obj_loc_x, obj_loc_y, obj_loc_z | lis_loc_x, lis_loc_y, lis_loc_z | date_time | |
| 2A | 0 | -20, 0, 0 | -20, 40, -1 | 2014.11.4.19.12.15 | r (0, -20, 0, 0, -20, 40, -1, 2014.11.4.19.12.15) |
| | 1 | 0, -10, 0 | -20, 40, -1 | 2014.11.4.19.12.15 | r (1, 0, -10, 0, -20, 40, -1, 2014.11.4.19.12.15) |
| | 2 | 20, 0, 0 | -20, 40, -1 | 2014.11.4.19.12.15 | r (2, 20, 0, 0, -20, 40, -1, 2014.11.4.19.12.15) |
| | 3 | 0, 10, 0 | -20, 40, -1 | 2014.11.4.19.12.15 | r (3, 0, 10, 0, -20, 40, -1, 2014.11.4.19.12.15) |
| 3A | 0 | -20, 0, 0 | 20, 40, -1 | 2014.11.4.19.12.15 | r (0, -20, 0, 0, 20, 40, -1, 2014.11.4.19.12.15) |
| | 1 | 0, -10, 0 | 20, 40, -1 | 2014.11.4.19.12.15 | r (1, 0, -10, 0, 20, 40, -1, 2014.11.4.19.12.15) |
| | 2 | 20, 0, 0 | 20, 40, -1 | 2014.11.4.19.12.15 | r (2, 20, 0, 0, 20, 40, -1, 2014.11.4.19.12.15) |
| | 3 | 0, 10, 0 | 20, 40, -1 | 2014.11.4.19.12.15 | r (3, 0, 10, 0, 20, 40, -1, 2014.11.4.19.12.15) |

FIG. 35

| VIEWPOINT | PARAMETER INFORMATION | | | | OUTPUT |
|---|---|---|---|---|---|
| | obj_type | obj_loc_x, obj_loc_y, obj_loc_z | lis_loc_x, lis_loc_y, lis_loc_z | date_time | RENDERING INFORMATION |
| 6 | 0 | -20, 0, 0 | 0, 30, -1 | 2014.11.5.18.34.50 | r (0, -20, 0, 0, 0, 30, -1, 2014.11.5.18.34.50) |
| | 1 | 0, -10, 0 | 0, 30, -1 | 2014.11.5.18.34.50 | r (1, 0, -10, 0, 0, 30, -1, 2014.11.5.18.34.50) |
| | 2 | 20, 0, 0 | 0, 30, -1 | 2014.11.5.18.34.50 | r (2, 20, 0, 0, 0, 30, -1, 2014.11.5.18.34.50) |
| | 3 | 0, 10, 0 | 0, 30, -1 | 2014.11.5.18.34.50 | r (3, 0, 10, 0, 0, 30, -1, 2014.11.5.18.34.50) |

REPRODUCTION APPARATUS AND REPRODUCTION METHOD

CROSS REFERENCE TO RELATED APPLICATIONS

The present application is a Divisional application of U.S. patent application Ser. No. 16/340,791, filed Apr. 10, 2019, which is a National Phase of International Patent Application No. PCT/JP2017/040617 filed on Nov. 10, 2017, which claims the benefit of priority from Japanese Patent Application No. 2016-228598 filed in the Japan Patent Office on Nov. 25, 2016 and also claims the benefit of priority from Japanese Patent Application No. 2017-062303 filed in the Japan Patent Office on Mar. 28, 2017. Each of the above-referenced applications is hereby incorporated herein by reference in its entirety.

TECHNICAL FIELD

The present technology relates to a reproduction apparatus, a reproduction method, an information processing apparatus, an information processing method, and a program, and, in particular, to a reproduction apparatus, a reproduction method, an information processing apparatus, an information processing method, and a program which can realize reproduction of highly flexible audio data while reflecting the intention of a content creator.

BACKGROUND ART

A picture included in an instructional video of a musical instrument performance, or the like is generally a picture obtained by cut edit or the like in advance by a content creator. Furthermore, the sound is sound obtained by appropriately mixing a plurality of sound sources, such as commentary voice and performance sound of a musical instrument, by the content creator for 2-channel, 5.1-channel, and the like. Therefore, a user can view the content only with the picture and sound in the viewpoint intended by the content creator.

Incidentally, object-based audio technology has been attracting attention in recent years. The object-based audio data is constituted by an audio waveform signal of an object and metadata indicating localization information represented by a relative position from a reference viewpoint.

The object-based audio data is reproduced so as to, on the basis of the metadata, render the waveform signal into a signal of the desired number of channels compatible with a system on a reproduction side. Examples of the rendering technique include vector based amplitude panning (VBAP) (e.g., Non-Patent Documents 1 and 2).

CITATION LIST

Non-Patent Document

Non-Patent Document 1: ISO/IEC 23008-3 Information technology—High efficiency coding and media delivery in heterogeneous environments—Part 3: 3D audio Non-Patent Document 2: Ville Pulkki, "Virtual Sound Source Positioning Using Vector Base Amplitude Panning," Journal of AES, vol. 45, no. 6, pp. 456-466, 1997

SUMMARY OF THE INVENTION

Problems to be Solved by the Invention

Even in the object-based audio data, sound localization is determined by metadata of each object. Therefore, the user can view the content only with the sound of the rendering result prepared in advance in accordance with the metadata, in other words, only with the sound at a determined viewpoint (presumed listening position) and a localized position thereto.

Thereupon, it can be considered to enable selection of any presumed listening positions, correct the metadata in accordance with the presumed listening position selected by the user, and perform rendering reproduction in which the localized position is modified by using the corrected metadata.

However, in this case, the reproducing sound becomes sound that mechanically reflects the change in the relative positional relationship of each object and does not always become the satisfactory sound, that is, the sound desired to be expressed by the content creator.

The present technology has been made in light of such a situation and can realize reproduction of highly flexible audio data while reflecting the intention of the content creator.

Solutions to Problems

A reproduction apparatus according to one aspect of the present technology includes an acquisition unit that acquires content including audio data of each of audio objects and rendering parameters of the audio data for each of a plurality of presumed listening positions, and a rendering unit that renders the audio data on the basis of the rendering parameters for a selected predetermined presumed listening position and outputs an audio signal.

The content can further include information regarding the presumed listening positions set in advance. In this case, it is possible to further provide a display control unit that causes a screen used to select the presumed listening position to be displayed on the basis of the information regarding the presumed listening positions.

The rendering parameters for each of the presumed listening positions can include localization information representing positions where the audio objects are localized and gain information which is a parameter for gain adjusting of the audio data.

The rendering unit can render the audio data of an audio object selected as an audio object, of which a sound source position is fixed, on the basis of the rendering parameters different from the rendering parameters for the selected presumed listening position.

The rendering unit is able to not render the audio data of a predetermined audio object among the plurality of the audio objects constituting sounds of the content.

It is possible to further provide a generation unit that generates the rendering parameters of each of audio objects for the presumed listening position, for which the rendering parameters are not prepared, on the basis of the rendering parameters for the presumed listening positions. In this case, the rendering unit can render the audio data of each of the audio objects by using the rendering parameters generated by the generation unit.

The generation unit can generate the rendering parameters for the presumed listening position, for which the rendering parameters are not prepared, on the basis of the rendering parameters for the plurality of near presumed listening positions for which the rendering parameters are prepared.

The generation unit can generate the rendering parameters for the presumed listening position, for which the rendering parameters are not prepared, on the basis of the rendering parameters included in the content acquired in the past.

The generation unit can generate the rendering parameters for the presumed listening position, for which the rendering parameters are not prepared, by using an estimator.

The acquisition unit can acquire the estimator for a venue where the content is recorded, and the generation unit can generate the rendering parameters by using the estimator acquired by the acquisition unit.

The estimator can be constituted by learning by using the rendering parameters included at least in the content acquired in the past.

The content can further include video data used to display a picture from the presumed listening positions as viewpoint positions. In this case, it is possible to further provide a video reproduction unit that reproduces the video data and causes the picture from the selected predetermined presumed listening position as a viewpoint position to be displayed.

According to one aspect of the present technology, content including audio data of each of audio objects and rendering parameters of the audio data for each of a plurality of presumed listening positions is acquired, the audio data is rendered on the basis of the rendering parameters for a selected predetermined presumed listening position, and an audio signal is outputted.

Effects of the Invention

According to the present technology, it is possible to realize reproduction of highly flexible audio data while reflecting the intention of the content creator.

Note that the effects described herein are not necessarily limited and may be any one of the effects described in the present disclosure.

BRIEF DESCRIPTION OF THE DRAWINGS

FIG. 1 is a view showing one scene of content.

FIGS. 2A and 2B are diagrams showing examples of audio objects and viewpoints.

FIG. 3 is a diagram showing examples of rendering parameters for the viewpoint #1.

FIG. 4 is a view showing illustrative localization of each audio object.

FIG. 5 is a diagram showing an example of gain distribution of each audio object.

FIG. 6 is a diagram showing examples of rendering parameters for the viewpoints #2 to #5.

FIG. 13 is a diagram showing other examples of the rendering parameters.

FIG. 15 is a diagram showing examples of rendering parameters for a viewpoint #6 and a viewpoint #7.

FIG. 16 is a view showing illustrative localization of each audio object for the viewpoint #6.

FIG. 18 is a diagram showing examples of the pseudo-rendering parameters for the arbitrary viewpoint #X.

FIG. 19 is a view showing illustrative localization of each audio object by using the pseudo-rendering parameters.

FIG. 30 is a diagram showing rendering parameters for viewpoints 1 to 5.

FIG. 31 is a diagram showing the rendering parameters for the viewpoints 1 to 5, continued from FIG. 30.

FIG. 34 is a diagram showing rendering parameters for the viewpoint 2A and the viewpoint 3A.

FIG. 35 is a diagram showing rendering parameters for the viewpoint 6.

MODE FOR CARRYING OUT THE INVENTION

Figure 7:
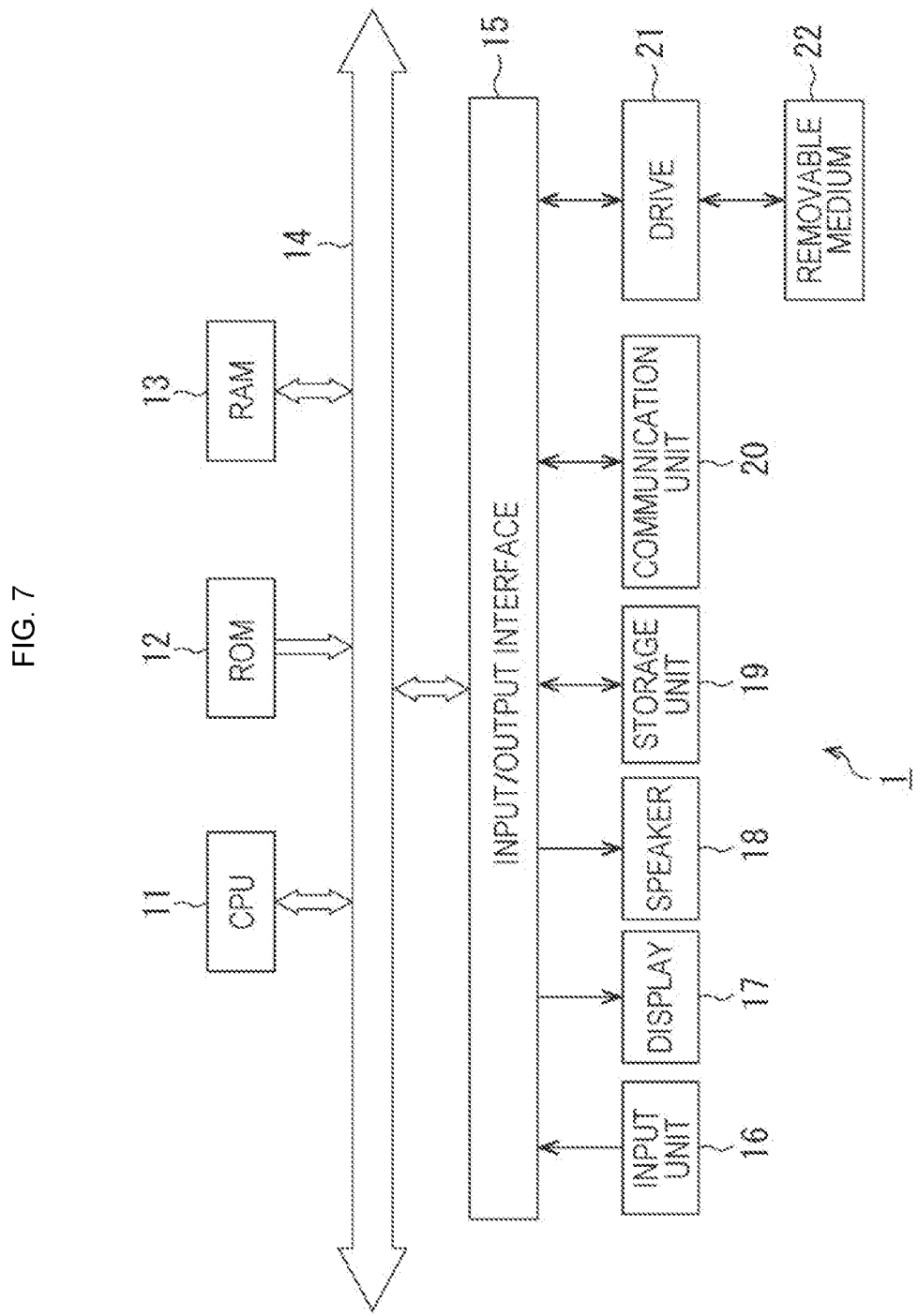
FIG. 7 is a block diagram showing a configuration example of the reproduction apparatus.

Hereinafter, modes for carrying out the present technology will be described. The description will be given in the following order.

First Embodiment
1. About Content
2. Configuration and Operation of Reproduction Apparatus
3. Another Configuration Example of Reproduction Apparatus
4. Examples of Rendering Parameters
5. Example of Free Viewpoint
6. Configuration and Operation of Content Generation Apparatus
7. Modification Examples
Second Embodiment
1. Configuration Example of Distribution System
2. Example of Generating Rendering Parameters
3. Another Configuration Example of Distribution System First Embodiment <1. About Content>

FIG. 1 is a view showing one scene of content reproduced by a reproduction apparatus according to one embodiment of the present technology.

A picture of the content reproduced by the reproduction apparatus is a picture of which a viewpoint can be switched. The content includes video data used to display pictures from a plurality of viewpoints.

Furthermore, the sound of the content reproduced by the reproduction apparatus is sound of which a viewpoint (presumed listening position) can be switched such that, for example, the position of the viewpoint of the picture is set as a listening position. In a case where the viewpoint is switched, the localized position of the sound switches.

The sound of the content is prepared as object-based audio. The audio data included in the content includes waveform data of each audio object and metadata for localizing a sound source of each audio object.

The content constituted by such video data and audio data is provided to the reproduction apparatus in a form multiplexed by a predetermined method such as MPEG-H.

The following description is given where the reproduction target content is instructional video of a musical instrument performance, but the present technology can be applied to various contents including object-based audio data. For example, a multi-viewpoint drama including multi-viewpoint pictures and sound, in which lines, background sound, sound effects, BGM, and the like are constituted by audio objects, or the like is considered as such content.

A horizontally long rectangular region (screen) shown in FIG. 1 is displayed on a display of the reproduction apparatus. The example in FIG. 1 shows a performance by a band which includes a person H1 playing the bass, a person H2 playing the drums, a person H3 playing the main guitar, and a person H4 playing the side guitar in order from the left. The picture shown in FIG. 1 is a picture of which the viewpoint is at the position where the entire band is seen from the front.

As shown in FIG. 2A, each independent waveform data is recorded in the content as each audio object of performances of the bass, the drums, the main guitar, and the side guitar and commentary voice by a teacher.

The following description is given where an instruction target is the performance of the main guitar. The performances of the side guitar, the bass, and the drums are accompaniments. FIG. 2B shows examples of viewpoints of the instructional video of which the instruction target is the performance of the main guitar.

As shown in FIG. 2B, a viewpoint #1 is a viewpoint at the position where the entire band is seen from the front (FIG. 1). A viewpoint #2 is a viewpoint at the position where only the person H3 playing the main guitar is seen from the front.

A viewpoint #3 is a viewpoint at the position where a close-up of the vicinity of the left hand of the person H3 playing the main guitar is seen. A viewpoint #4 is a viewpoint at the position where a close-up of the vicinity of the right hand of the person H3 playing the main guitar is seen. A viewpoint #5 is a viewpoint at the position of the person H3 playing the main guitar. Video data used to display the picture from each viewpoint is recorded in the content.

FIG. 3 is a diagram showing examples of rendering parameters of each audio object for the viewpoint #1.

The examples in FIG. 3 show localization information and gain information as rendering parameters of each audio object. The localization information includes information indicating an azimuth and information indicating an elevation. The azimuth and the elevation are expressed as 0° for the median plane and the horizontal plane, respectively.

The rendering parameters shown in FIG. 3 indicate that the sound of the main guitar is localized to the right by 10°, the sound of the side guitar to the right by 30°, the sound of the bass to the left by 30°, the sound of the drums to the left by 15°, and the commentary voice to 0° and all the gains are set to 1.0.

FIG. 4 is a diagram showing illustrative localization of each audio object for the viewpoint #1, which is realized by using the parameters shown in FIG. 3.

Positions P1 to P5 circled in FIG. 4 indicate the positions where the bass performance, the drum performance, the commentary voice, the main guitar performance, and the side guitar performance are localized, respectively.

By using the parameters shown in FIG. 3 to render the waveform data of each audio object, a user listens to each performance and the commentary voice localized as shown in FIG. 4. FIG. 5 is a diagram showing an example of L/R gain distribution of each audio object for the viewpoint #1. In this example, a speaker used to output the sounds is a 2-channel speaker system.

As shown in FIG. 6, such rendering parameters of each audio object are also prepared for each of the viewpoints #2 to #5.

The rendering parameters for the viewpoint #2 are parameters for mainly reproducing the sound of the main guitar along with the viewpoint picture focusing on the main guitar. As for the gain information of each audio object, the gains of the side guitar, the bass, and the drums are suppressed compared with the gains of the main guitar and the commentary voice.

The rendering parameters for the viewpoints #3 and #4 are parameters for reproducing the sound more concentrated on the main guitar than the case of the viewpoint #2, along with the picture concentrated on the guitar fingering.

As for the viewpoint #5, the parameters are for reproducing the sound localized at the viewpoint of the player along with the viewpoint picture so that the user can pretend to be the person H3, the main guitar player.

Thus, the rendering parameters of each audio object are prepared for each viewpoint in the audio data of the content reproduced by the reproduction apparatus. The rendering parameters for each viewpoint are determined in advance by the content creator and are transmitted or kept as the metadata together with the waveform data of the audio objects.

<2. Configuration and Operation of Reproduction Apparatus>

FIG. 7 is a block diagram showing a configuration example of the reproduction apparatus.

A reproduction apparatus 1 in FIG. 7 is an apparatus used to reproduce the multi-viewpoint content including the object-based audio data for which the rendering parameters for each viewpoint are prepared. The reproduction apparatus 1 is, for example, a personal computer and manipulated by a content viewer.

As shown in FIG. 7, a central processing unit (CPU) 11, a read only memory (ROM) 12, and a random access memory (RAM) 13 are connected to each other by a bus 14. The bus 14 is further connected to an input/output interface 15. To the input/output interface 15, an input unit 16, a display 17, a speaker 18, a storage unit 19, a communication unit 20, and a drive 21 are connected.

The input unit 16 is constituted by a keyboard, a mouse, and the like. The input unit 16 outputs a signal representing the contents of the manipulation of the user.

The display 17 is a display such as a liquid crystal display (LCD) or an organic EL display. The display 17 displays various kinds of information such as a selection screen used to select the viewpoint, and a picture of the reproduced content. The display 17 may be a display integrated with the reproduction apparatus 1 or an external display connected to the reproduction apparatus 1.

The speaker 18 outputs the sounds of the reproduced content. The speaker 18 is, for example, a speaker connected to the reproduction apparatus 1.

The storage unit 19 is constituted by a hard disk, a nonvolatile memory, and the like. The storage unit 19 stores various kinds of data such as a program executed by the CPU 11 and the reproducing target content.

The communication unit 20 is constituted by a network interface and the like and communicates with an external apparatus via a network such as the Internet. The content distributed via the network may be received by the communication unit 20 and reproduced.

The drive 21 writes data in an attached removable medium 22 and reads out data recorded on the removable medium 22. In the reproduction apparatus 1, the content read out from the removable medium 22 by the drive 21 is reproduced as appropriate.

Figure 8:
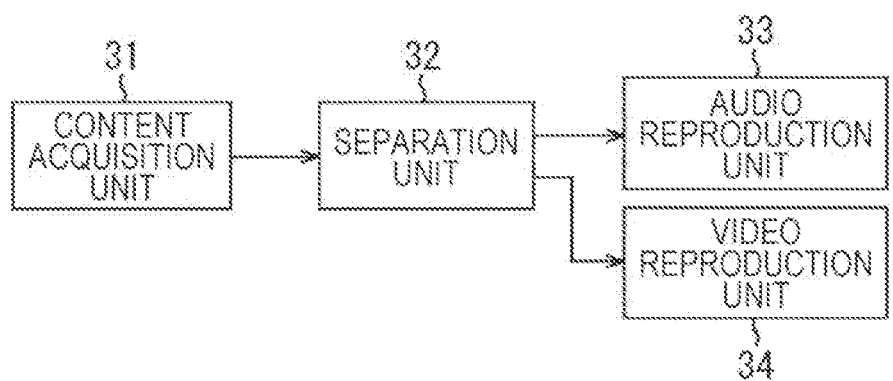
FIG. 8 is a block diagram showing a functional configuration example of the reproduction apparatus.

FIG. 8 is a block diagram showing a functional configuration example of the reproduction apparatus 1.

At least part of the configuration shown in FIG. 8 is realized by executing a predetermined program with the CPU 11 in FIG. 7. In the reproduction apparatus 1, a content acquisition unit 31, a separation unit 32, an audio reproduction unit 33, and a video reproduction unit 34 are realized.

The content acquisition unit 31 acquires content such as the above-described instructional video including video data and audio data.

In a case where the content is provided to the reproduction apparatus 1 via the removable medium 22, the content acquisition unit 31 controls the drive 21 to read out and acquire the content recorded on the removable medium 22. Furthermore, in a case where the content is provided to the reproduction apparatus 1 via the network, the content acquisition unit 31 acquires the content which is sent from the external apparatus and received by the communication unit 20. The content acquisition unit 31 outputs the acquired content to the separation unit 32.

The separation unit 32 separates the video data and the audio data included in the content supplied from the content acquisition unit 31. The separation unit 32 outputs the video data of the content to the video reproduction unit 34 and outputs the audio data to the audio reproduction unit 33.

The audio reproduction unit 33 renders, on the basis of the metadata, the waveform data constituting the audio data supplied from the separation unit 32 and causes the speaker 18 to output the sounds of the content.

The video reproduction unit 34 decodes the video data supplied from the separation unit 32 and causes the display 17 to display a picture of the content from a predetermined viewpoint.

Figure 9:
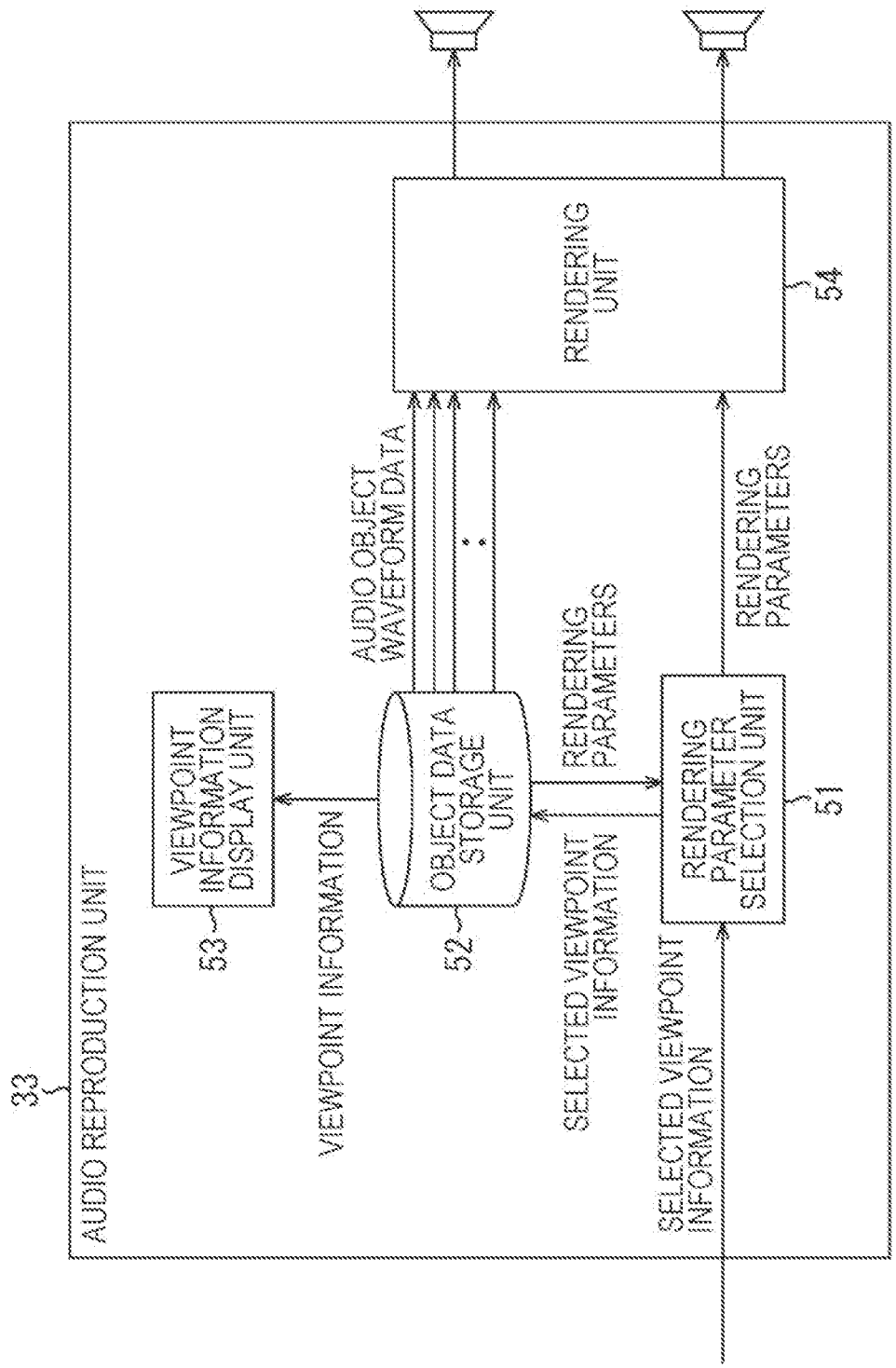
FIG. 9 is a block diagram showing a configuration example of the audio reproduction unit in FIG. 8.

FIG. 9 is a block diagram showing a configuration example of the audio reproduction unit 33 in FIG. 8.

The audio reproduction unit 33 is constituted by a rendering parameter selection unit 51, an object data storage unit 52, a viewpoint information display unit 53, and a rendering unit 54.

The rendering parameter selection unit 51 selects, in accordance with selected viewpoint information inputted, the rendering parameters for the viewpoint selected by the user from the object data storage unit 52 and outputs the rendering parameters to the rendering unit 54. In a case where a predetermined viewpoint is selected by the user from among the viewpoints #1 to #5, the selected viewpoint information representing the selected viewpoint is inputted into the rendering parameter selection unit 51.

The object data storage unit 52 stores the waveform data of each audio object, the viewpoint information, and the rendering parameters of each audio object for each viewpoint of the viewpoints #1 to #5.

The rendering parameters stored in the object data storage unit 52 are read out by the rendering parameter selection unit 51, and the waveform data of each audio object is read out by the rendering unit 54. The viewpoint information is read out by the viewpoint information display unit 53. Note that the viewpoint information is information representing that the viewpoints #1 to #5 are prepared as the viewpoints of the content.

The viewpoint information display unit 53 causes the display 17 to display a viewpoint selection screen, which is a screen used to select a reproducing viewpoint, in accordance with the viewpoint information read out from the object data storage unit 52. The viewpoint selection screen shows that a plurality of viewpoints, the viewpoints #1 to #5, are prepared in advance.

In the viewpoint selection screen, the presence of the plurality of viewpoints may be indicated by icons or characters or may be indicated by a thumbnail image representing each viewpoint. The user manipulates the input unit 16 to select the predetermined viewpoint from among the plurality of viewpoints. The selected viewpoint information representing the viewpoint selected by the user using the viewpoint selection screen is inputted into the rendering parameter selection unit 51.

The rendering unit 54 reads out and acquires the waveform data of each audio object from the object data storage unit 52. The rendering unit 54 also acquires the rendering parameters for the viewpoint selected by the user supplied from the rendering parameter selection unit 51.

The rendering unit 54 renders the waveform data of each audio object in accordance with the rendering parameters acquired from the rendering parameter selection unit 51 and outputs the audio signal of each channel to the speaker 18.

For example, the speaker 18 is a 2-channel speaker system which is opened each by 30° to the left and right, and the viewpoint #1 is selected. In this case, the rendering unit 54 obtains the gain distribution shown in FIG. 5 on the basis of the rendering parameters in FIG. 3 and performs the reproduction so as to allocate the audio signal of each audio object to each of LR channels in accordance with the obtained gain distribution. At the speaker 18, the sounds of the content are outputted on the basis of the audio signals supplied from the rendering unit 54. Thus, the localized reproduction as shown in FIG. 4 is realized.

In a case where the speaker 18 is constituted by a three-dimensional speaker system such as 5.1-channel or 22.2-channel, the rendering unit 54 uses a rendering technique such as VBAP to generate the audio signal of each channel for each speaker system.

Here, with reference to the flowchart in FIG. 10, the audio reproduction processing of the reproduction apparatus 1 having the above configuration will be described.

Figure 10:
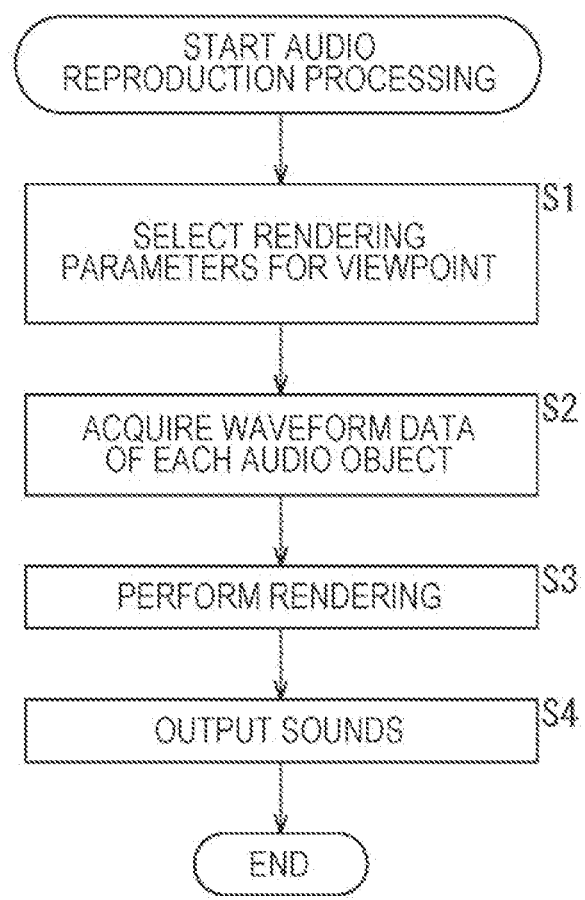
FIG. 10 is a flowchart for explaining the audio reproduction processing of the reproduction apparatus.

The processing in FIG. 10 is started when the reproducing target content is selected and the viewing viewpoint is selected by the user using the viewpoint selection screen. The selected viewpoint information representing the viewpoint selected by the user is inputted into the rendering parameter selection unit 51. Note that, as for the reproduction of the video, the processing for displaying the picture from the viewpoint selected by the user is performed by the video reproduction unit 34.

In step S1, the rendering parameter selection unit 51 selects, in accordance with the selected viewpoint information inputted, the rendering parameters for the selected viewpoint from the object data storage unit 52. The rendering parameter selection unit 51 outputs the selected rendering parameters to the rendering unit 54.

In step S2, the rendering unit 54 reads out and acquires the waveform data of each audio object from the object data storage unit 52.

In step S3, the rendering unit 54 renders the waveform data of each audio object in accordance with the rendering parameters supplied from the rendering parameter selection unit 51.

In step S4, the rendering unit 54 outputs the audio signal of each channel obtained by rendering to the speaker 18 and causes the speaker 18 to output the sound of each audio object.

While the content is reproduced, the above processing is repeatedly performed. For example, in a case where the viewpoint is switched by the user during the reproduction of the content, the rendering parameters used for rendering are also switched to the rendering parameters for the newly selected viewpoint.

As described above, since the rendering parameters of each audio object are prepared for each viewpoint and the reproduction is performed using the rendering parameters, the user can select a desired viewpoint from among the plurality of viewpoints and view the content with the sounds matching the selected viewpoint. The sounds reproduced by using the rendering parameters prepared for the viewpoint selected by the user can be said to be the sounds with high musicality elaborated by the content creator.

Suppose a case where one rendering parameter common to all the viewpoints is prepared and a viewpoint is selected. When the rendering parameter is corrected so as to mechanically reflect the change in the positional relationship of the selected viewpoint and is used for the reproduction, there is a possibility that this sound becomes sound that the content creator does not intend. However, such a circumstance can be prevented.

In other words, it is possible to realize reproduction of highly flexible audio data by the above processing in that the viewpoint can be selected while reflecting the intention of the content creator.

<3. Another Configuration Example of Reproduction Apparatus>

Figure 11:
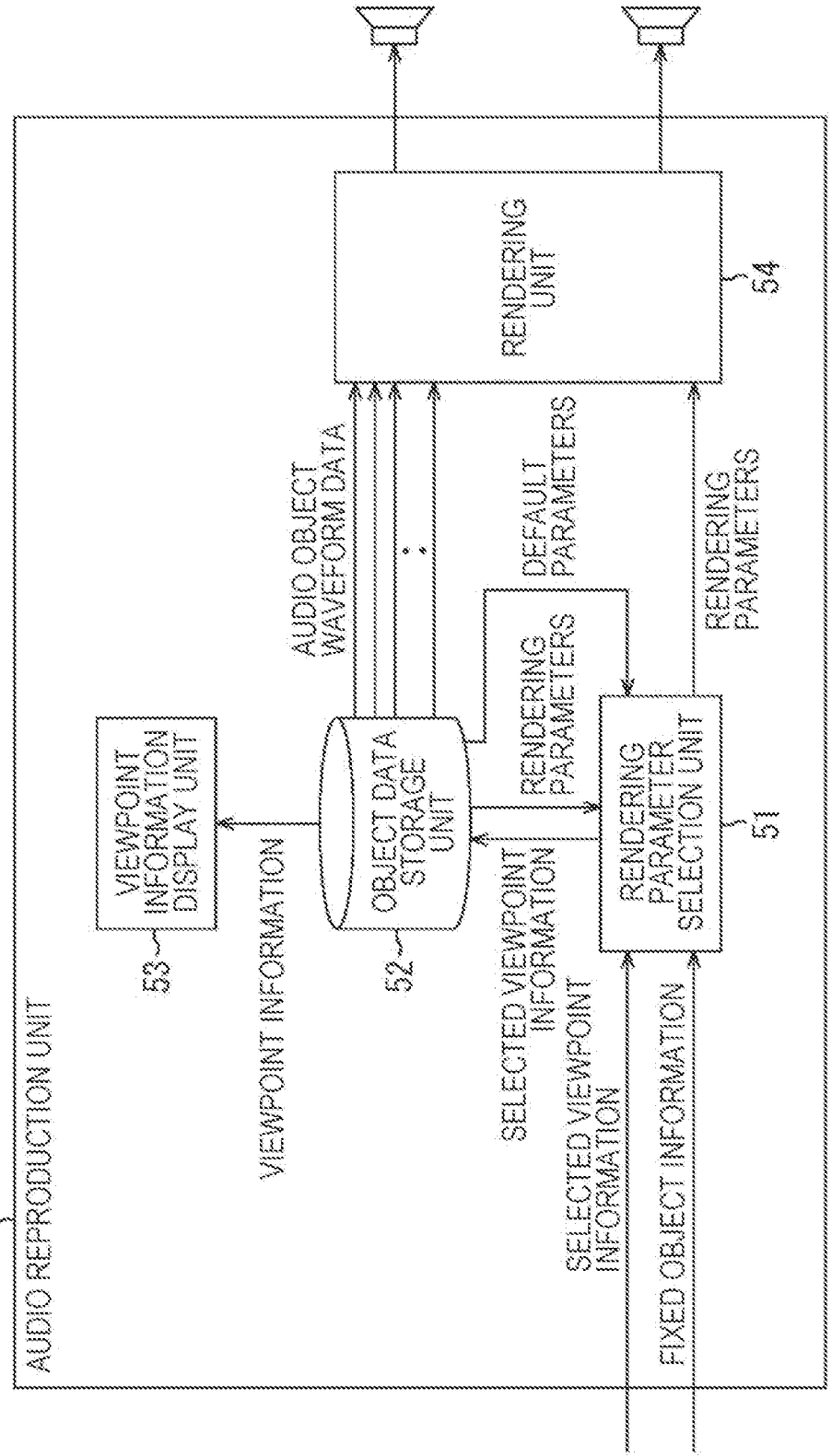
FIG. 11 is a block diagram showing another configuration example of the audio reproduction unit.

FIG. 11 is a block diagram showing another configuration example of the audio reproduction unit 33.

An audio reproduction unit 33 shown in FIG. 11 has the configuration similar to the configuration in FIG. 9. Redundant descriptions will be omitted as appropriate.

In the audio reproduction unit 33 having the configuration shown in FIG. 11, it is possible to designate an audio object of which the localized position is not desired to be changed according to the viewpoint. Among the above-described audio objects, for example, the localized position of the commentary voice is preferred to be fixed regardless of a position of a viewpoint in some cases.

Information representing a fixed object, which is an audio object of which the localized position is fixed, is inputted as fixed object information into a rendering parameter selection unit 51. The fixed object may be designated by the user or may be designated by the content creator.

The rendering parameter selection unit 51 in FIG. 11 reads out, from an object data storage unit 52, default rendering parameters as the rendering parameters of the fixed object designated by the fixed object information and outputs the default rendering parameters to a rendering unit 54.

For the default rendering parameters, for example, the rendering parameters for the viewpoint #1 may be used, or dedicated rendering parameters may be prepared.

Furthermore, for the audio objects other than the fixed object, the rendering parameter selection unit 51 reads out the rendering parameters for the viewpoint selected by the user from the object data storage unit 52 and outputs the rendering parameters to the rendering unit 54.

The rendering unit 54 renders each audio object on the basis of the default rendering parameters and the rendering parameters for the viewpoint selected by the user supplied from the rendering parameter selection unit 51. The rendering unit 54 outputs the audio signal of each channel obtained by rendering to the speaker 18.

For all the audio objects, the rendering may be performed using the default rendering parameters instead of the rendering parameters for the selected viewpoint.

Figure 12:
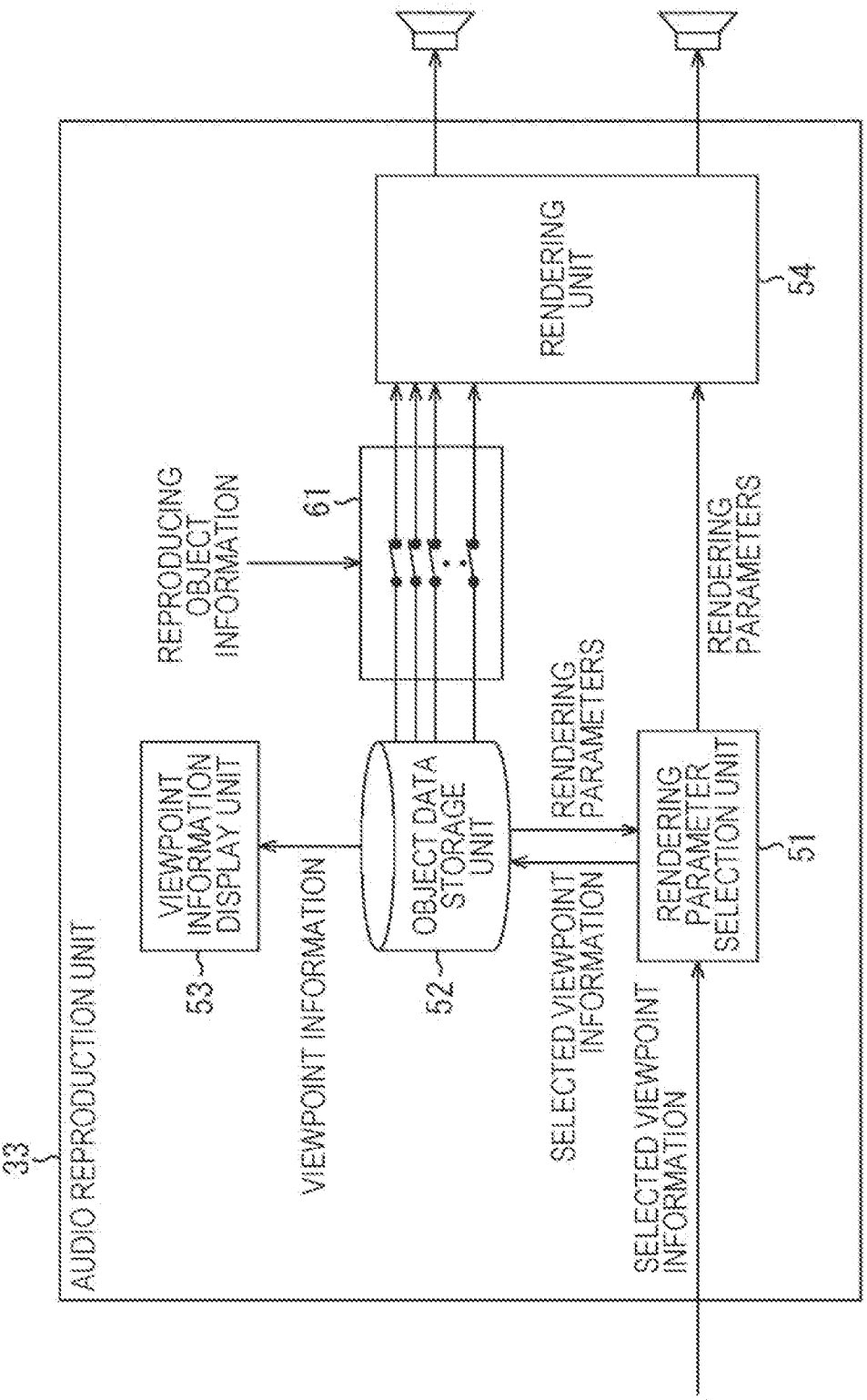
FIG. 12 is a block diagram showing still another configuration example of the audio reproduction unit.

FIG. 12 is a block diagram showing still another configuration example of the audio reproduction unit 33.

The configuration of an audio reproduction unit 33 shown in FIG. 12 is different from the configuration in FIG. 9 in that a switch 61 is provided between an object data storage unit 52 and a rendering unit 54.

In the audio reproduction unit 33 having the configuration shown in FIG. 12, it is possible to designate an audio object to be reproduced or an audio object not to be reproduced. Information representing an audio object required for the reproduction is inputted as reproducing object information into the switch 61. The object required for the reproduction may be designated by the user or may be designated by the content creator.

The switch 61 in FIG. 12 outputs the waveform data of the audio object designated by the reproducing object information to the rendering unit 54.

The rendering unit 54 renders the waveform data of the audio object required for the reproduction on the basis of the rendering parameters for the viewpoint selected by the user supplied from a rendering parameter selection unit 51. In other words, the rendering unit 54 does not render the audio objects not required for the reproduction.

The rendering unit 54 outputs the audio signal of each channel obtained by rendering to the speaker 18.

Thus, for example, by designating the main guitar as the audio object not required for the reproduction, the user can mute the sound of the main guitar, which is the model, and superimpose her/his performance while viewing the instructional video. In this case, only the waveform data of the audio objects other than the main guitar are supplied from the object data storage unit 52 to the rendering unit 54.

The muting may be realized by controlling the gains, instead of controlling the output of the waveform data to the rendering unit 54. In this case, the reproducing object information is inputted into the rendering unit 54. For example, the rendering unit 54 adjusts the gain of the main guitar to 0 in accordance with the reproducing object information and the gains of other audio objects in accordance with the rendering parameters supplied from the rendering parameter selection unit 51 and performs the rendering.

By fixing the localized position irrespective of the selected viewpoint and reproducing only the necessary sounds in this manner, the user may be able to reproduce the content according to his/her preference.

<4. Examples of Rendering Parameters>

Particularly in the creation of music content, the sound production of each musical instrument is performed by adjusting the sound quality by, for example, an equalizer, and adding a reverberation component with a reverb, in addition to adjusting the localized positions and the gains. Such parameters used for the sound production may also be added to the audio data as the metadata together with the localization information and the gain information and used for the rendering.

Other parameters added to the localization information and the gain information are also prepared for each viewpoint.

FIG. 13 is a diagram showing other examples of the rendering parameters.

In the examples in FIG. 13, in addition to the localization information and the gain information, equalizer information, compressor information, and reverb information are included as the rendering parameters.

The equalizer information is constituted by each piece of information regarding a type of a filter, center frequency of the filter, sharpness, gain, and pre-gain used for acoustic adjustment by an equalizer. The compressor information is constituted by each piece of information regarding frequency bandwidth, threshold, ratio, gain, attack time, and release time used for acoustic adjustment by a compressor. The reverb information is constituted by each piece of information regarding initial reflection time, initial reflection gain, reverberation time, reverberation gain, dumping, and dry/wet coefficient used for acoustic adjustment by a reverb.

The parameters included in the rendering parameters can be information other than the information shown in FIG. 13.

Figure 14:
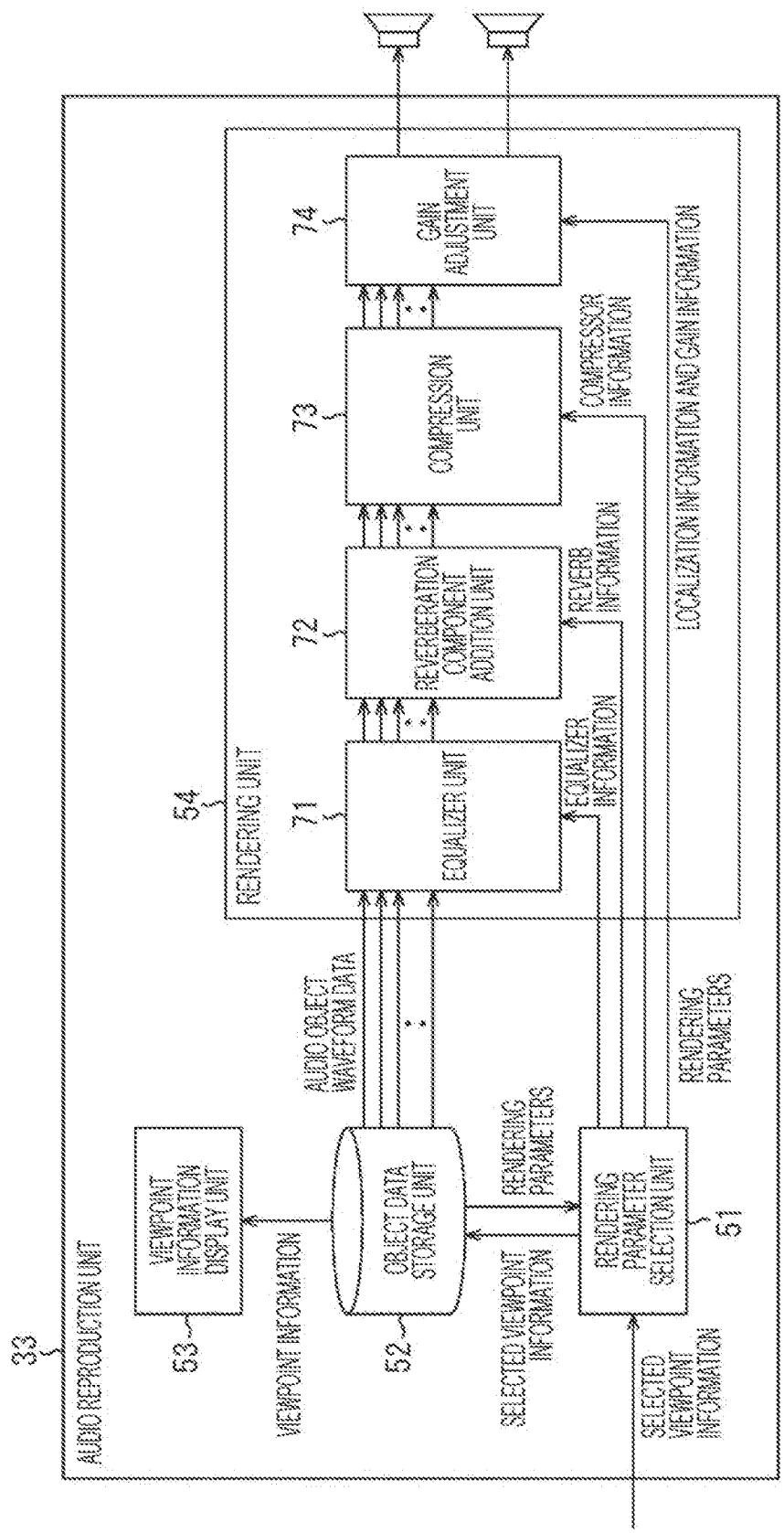
FIG. 14 is a block diagram showing a configuration example of an audio reproduction unit.

FIG. 14 is a block diagram showing a configuration example of the audio reproduction unit 33 compatible with the processing of the rendering parameters including the information shown in FIG. 13.

The configuration of an audio reproduction unit 33 shown in FIG. 14 is different from the configuration in FIG. 9 in that a rendering unit 54 is constituted by an equalizer unit 71, a reverberation component addition unit 72, a compression unit 73, and a gain adjustment unit 74.

A rendering parameter selection unit 51 reads out, in accordance with selected viewpoint information inputted, the rendering parameters for the viewpoint selected by the user from an object data storage unit 52 and outputs the rendering parameters to the rendering unit 54.

The equalizer information, the reverb information, and the compressor information included in the rendering parameters outputted from the rendering parameter selection unit 51 are supplied to the equalizer unit 71, the reverberation component addition unit 72, and the compression unit 73, respectively. Furthermore, the localization information and the gain information included in the rendering parameters are supplied to the gain adjustment unit 74.

The object data storage unit 52 stores the rendering parameters of each audio object for each viewpoint together with the waveform data of each audio object and the viewpoint information. The rendering parameters stored in the object data storage unit 52 include each piece of information shown in FIG. 13. The waveform data of each audio object stored in the object data storage unit 52 is supplied to a rendering unit 54.

The rendering unit 54 performs separate sound quality adjustment processing on the waveform data of each audio object in accordance with each rendering parameter supplied from the rendering parameter selection unit 51. The rendering unit 54 performs gain adjustment on the waveform data obtained by performing the sound quality adjustment processing and outputs the audio signals to the speaker 18.

In other words, the equalizer unit 71 of the rendering unit 54 performs equalizing processing based on the equalizer information on the waveform data of each audio object and outputs the waveform data obtained by the equalizing processing to the reverberation component addition unit 72.

The reverberation component addition unit 72 performs reverberation component addition processing on the basis of the reverb information and outputs the waveform data, to which the reverberation component is added, to the compression unit 73.

The compression unit 73 performs compression processing based on the compressor information on the waveform data supplied from the reverberation component addition unit 72 and outputs the waveform data obtained by the compression processing to the gain adjustment unit 74.

The gain adjustment unit 74 performs, on the basis of the localization information and the gain information, gain adjustment of the gains of the waveform data supplied from the compression unit 73 and outputs the audio signal of each channel obtained by performing the gain adjustment to the speaker 18.

By using the rendering parameters as described above, the content creator can reflect his/her own sound production more in the rendering reproduction of the audio objects for each viewpoint. For example, how tones of the sounds change for each viewpoint due to the directivities of the sounds can be reproduced by these parameters. Furthermore, it is also possible to control intentional mixing composition of the sound by the content creator such that the sound of the guitar is intentionally suppressed for a certain viewpoint.

<5. Example of Free Viewpoint>

Hereinbefore, the viewpoint can be selected from among the plurality of viewpoints for which the rendering parameters are prepared, but an arbitrary viewpoint may be freely selected. The arbitrary viewpoint here is a viewpoint for which rendering parameters are not prepared.

In this case, pseudo-rendering parameters for the selected arbitrary viewpoint are generated by utilizing the rendering parameters for the two viewpoints adjacent to the arbitrary viewpoint. By applying the generated rendering parameters as the rendering parameters for the arbitrary viewpoint, it is possible to perform the rendering reproduction of the sounds for the arbitrary viewpoint.

The number of viewpoints of which the rendering parameters are used to generate the pseudo-rendering parameters is not limited to two, and the rendering parameters for the arbitrary viewpoint may be generated by using the rendering parameters for three or more viewpoints. Furthermore, the pseudo-rendering parameters may be generated by using the rendering parameters for any viewpoints in addition to the rendering parameters for the adjacent viewpoints as long as the rendering parameters are for a plurality of viewpoints in the vicinity of the arbitrary viewpoint.

FIG. 15 is a diagram showing examples of rendering parameters for two viewpoints, a viewpoint #6 and a viewpoint #7.

In the examples in FIG. 15, localization information and gain information are included as the rendering parameters of each of audio objects of the main guitar, the side guitar, the bass, the drums, and the commentary voice. Rendering parameters including the information shown in FIG. 13 can also be used as the rendering parameters shown in FIG. 15.

Furthermore, in the examples in FIG. 15, the rendering parameters for the viewpoint #6 represent that the sound of the main guitar is localized to the right by 10°, the sound of the side guitar to the right by 30°, the sound of the bass to the left by 30°, the sound of the drums to the left by 15°, and the commentary voice to 0°.

Meanwhile, the rendering parameters for the viewpoint #7 represent that the sound of the main guitar is localized to the right by 5°, the sound of the side guitar to the right by 10°, the sound of the bass to the left by 10°, the sound of the drums to the left by 8°, and the commentary voice to 0°.

Figure 17:
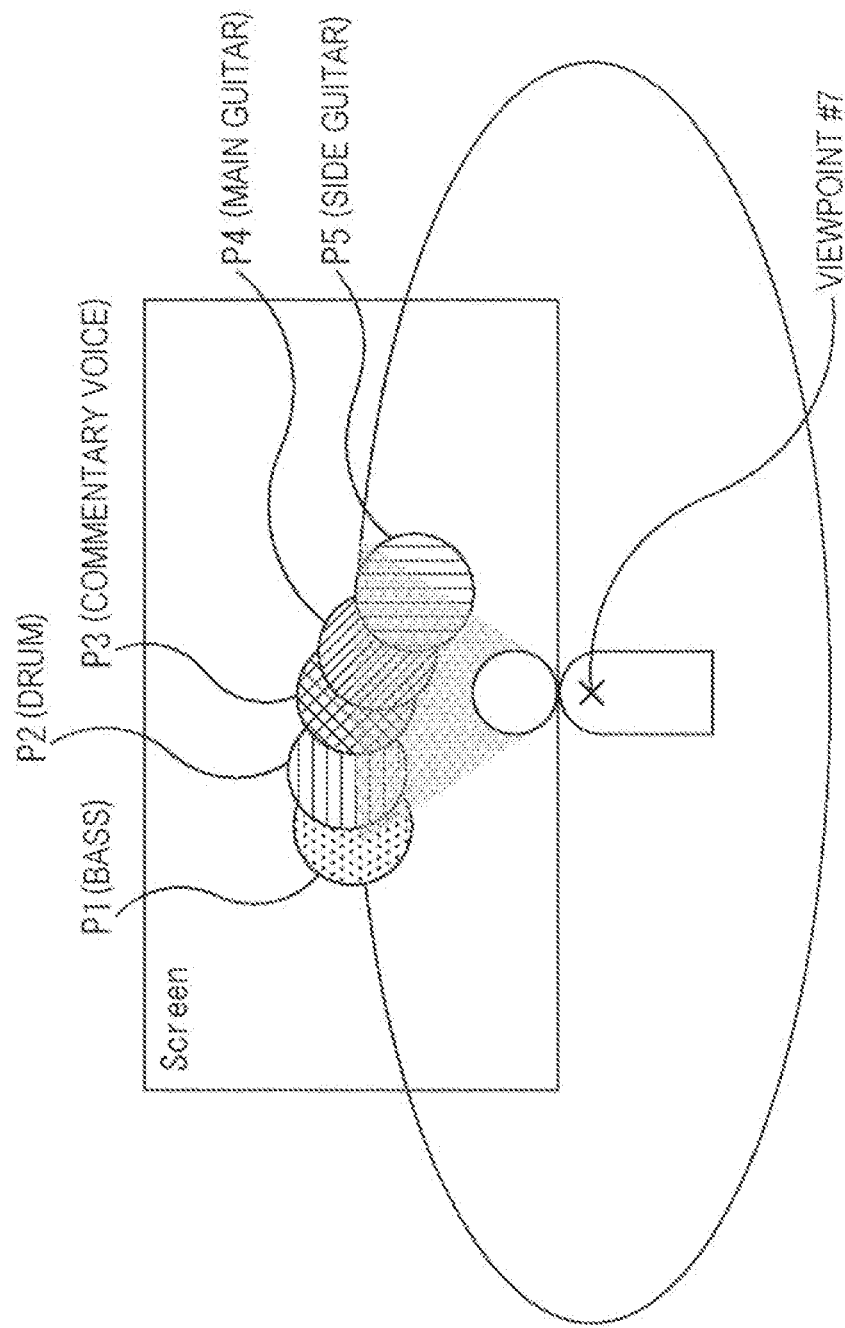
FIG. 17 is a view showing illustrative localization of each audio object for the viewpoint #7.

FIGS. 16 and 17 show illustrative localization of each audio object for the respective viewpoints, the viewpoint #6 and the viewpoint #7. As shown in FIG. 16, a viewpoint from the front is presumed to be the viewpoint #6, and a viewpoint from the right hand is presumed to be the viewpoint #7.

Here, an intermediate point between the viewpoint #6 and the viewpoint #7, in other words, a viewpoint from the front slightly to the right is selected as an arbitrary viewpoint #X. With respect to the arbitrary viewpoint #X, the viewpoint #6 and the viewpoint #7 are the adjacent viewpoints. The arbitrary viewpoint #X is a viewpoint for which rendering parameters are not prepared.

In this case, in the audio reproduction unit 33, pseudo-rendering parameters for the arbitrary viewpoint #X are generated by using the above-described rendering parameters for the viewpoint #6 and the viewpoint #7. For example, the pseudo-rendering parameters are generated by interpolation processing such as linear interpolation based on the rendering parameters for the viewpoint #6 and the viewpoint #7.

FIG. 18 is a diagram showing examples of the pseudo-rendering parameters for the arbitrary viewpoint #X.

In the examples in FIG. 18, the rendering parameters for the arbitrary viewpoint #X represent that the sound of the main guitar is localized to the right by 7.5°, the sound of the side guitar to the right by 20°, the sound of the bass to the left by 20°, the sound of the drums to the left by 11.5°, and the commentary voice to 0°. Each value shown in FIG. 18 is an intermediate value between the respective values of the rendering parameters for the viewpoint #6 and the viewpoint #7 shown in FIG. 15 and is obtained by linear interpolation processing.

FIG. 19 shows illustrative localization of each audio object by using the pseudo-rendering parameters shown in FIG. 18. As shown in FIG. 19, the arbitrary viewpoint #X is a viewpoint seen slightly from the right with respect to the viewpoint #6 shown in FIG. 16.

Figure 20:
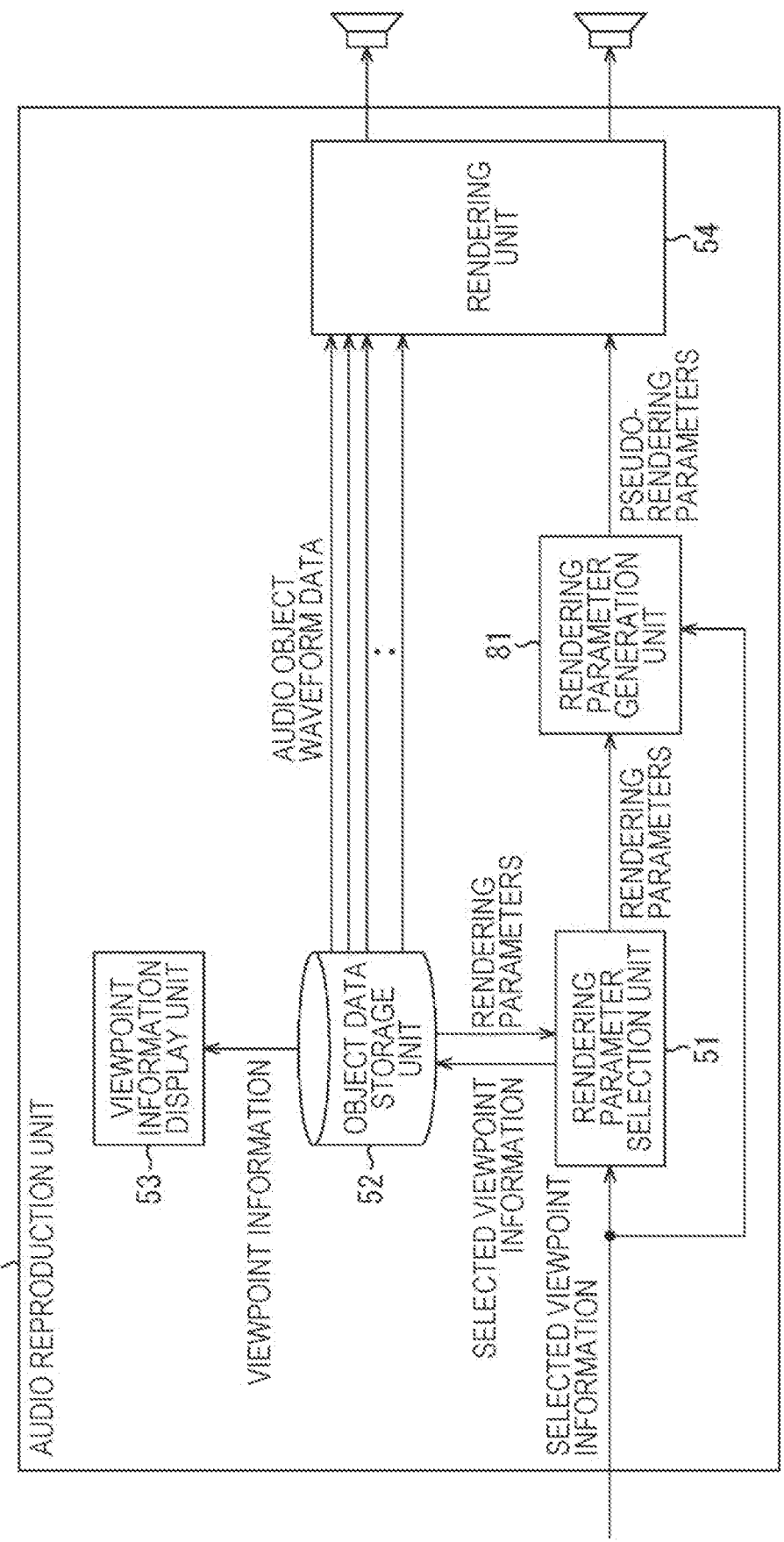
FIG. 20 is a block diagram showing a configuration example of an audio reproduction unit.

FIG. 20 is a block diagram showing a configuration example of the audio reproduction unit 33 having the function of generating the pseudo-rendering parameters as described above.

The configuration of an audio reproduction unit 33 shown in FIG. 20 is different from the configuration in FIG. 9 in that a rendering parameter generation unit 81 is provided between a rendering parameter selection unit 51 and a rendering unit 54. Selected viewpoint information representing the arbitrary viewpoint #X is inputted into the rendering parameter selection unit 51 and the rendering parameter generation unit 81.

The rendering parameter selection unit 51 reads out, in accordance with selected viewpoint information inputted, the rendering parameters for the plurality of viewpoints adjacent to the arbitrary viewpoint #X selected by the user from an object data storage unit 52. The rendering parameter selection unit 51 outputs the rendering parameters for the plurality of adjacent viewpoints to the rendering parameter generation unit 81.

For example, the rendering parameter generation unit 81 identifies, on the basis of the selected viewpoint information, the relative positional relationship between the arbitrary viewpoint #X and the plurality of adjacent viewpoints for which the rendering parameters are prepared. By performing the interpolation processing according to the identified positional relationship, the rendering parameter generation unit 81 generates the pseudo-rendering parameters on the basis of the rendering parameters supplied from the rendering parameter selection unit 51. The rendering parameter generation unit 81 outputs the generated pseudo-rendering parameters as the rendering parameters for the arbitrary viewpoint #X to the rendering unit 54.

The rendering unit 54 renders the waveform data of each audio object in accordance with the pseudo-rendering parameters supplied from the rendering parameter generation unit 81. The rendering unit 54 outputs the audio signal of each channel obtained by rendering to the speaker 18 and causes the speaker 18 to output the audio signals as the sounds for the arbitrary viewpoint #X.

Here, with reference to the flowchart in FIG. 21, the audio reproduction processing of the audio reproduction unit 33 having the configuration in FIG. 20 will be described.

Figure 21:
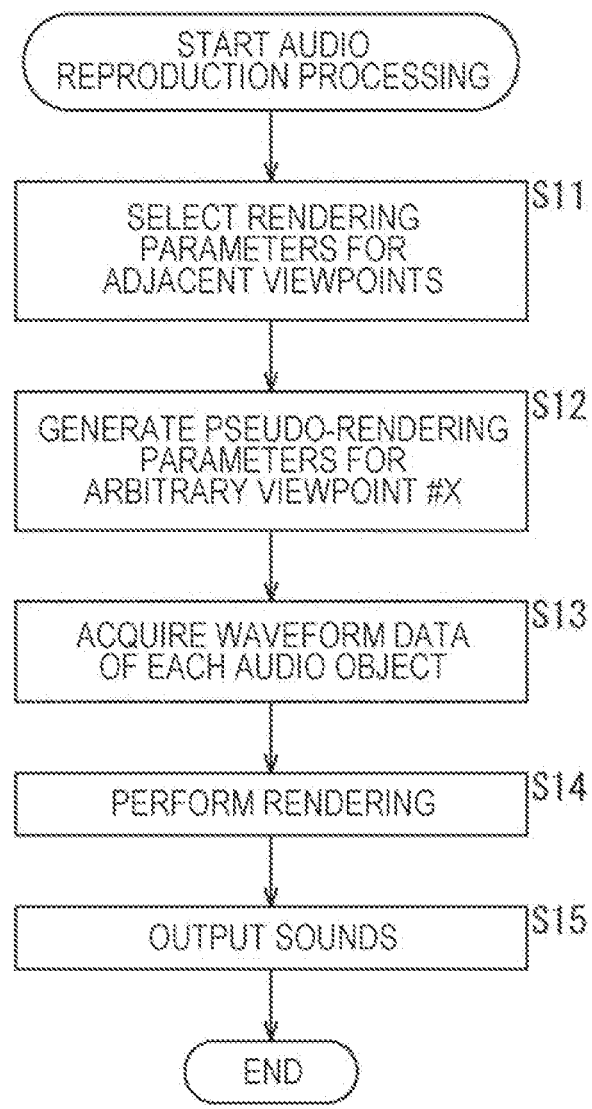
FIG. 21 is a flowchart for explaining another audio reproduction processing of the reproduction apparatus.

The processing in FIG. 21 is started, for example, when the arbitrary viewpoint #X is selected by the user using the viewpoint selection screen displayed by a viewpoint information display unit 53. Selected viewpoint information representing the arbitrary viewpoint #X is inputted into the rendering parameter selection unit 51 and the rendering parameter generation unit 81.

In step S11, the rendering parameter selection unit 51 selects the rendering parameters for the plurality of viewpoints adjacent to the arbitrary viewpoint #X from the object data storage unit 52 in accordance with the selected viewpoint information. The rendering parameter selection unit 51 outputs the selected rendering parameters to the rendering parameter generation unit 81.

In step S12, the rendering parameter generation unit 81 generates the pseudo-rendering parameters by performing the interpolation processing according to the positional relationship between the arbitrary viewpoint #X and the plurality of adjacent viewpoints for which the rendering parameters are prepared.

In step S13, the rendering unit 54 reads out and acquires the waveform data of each audio object from the object data storage unit 52.

In step S14, the rendering unit 54 renders the waveform data of each audio object in accordance with the pseudo-rendering parameters generated by the rendering parameter generation unit 81.

In step S15, the rendering unit 54 outputs the audio signal of each channel obtained by rendering to the speaker 18 and causes the speaker 18 to output the sound of each audio object.

With the above processing, the reproduction apparatus 1 can reproduce the audio localized with respect to the arbitrary viewpoint #X for which rendering parameters are not prepared. The user can freely select an arbitrarily viewpoint and view the content.

<6. Configuration and Operation of Content Generation Apparatus>

Figure 22:
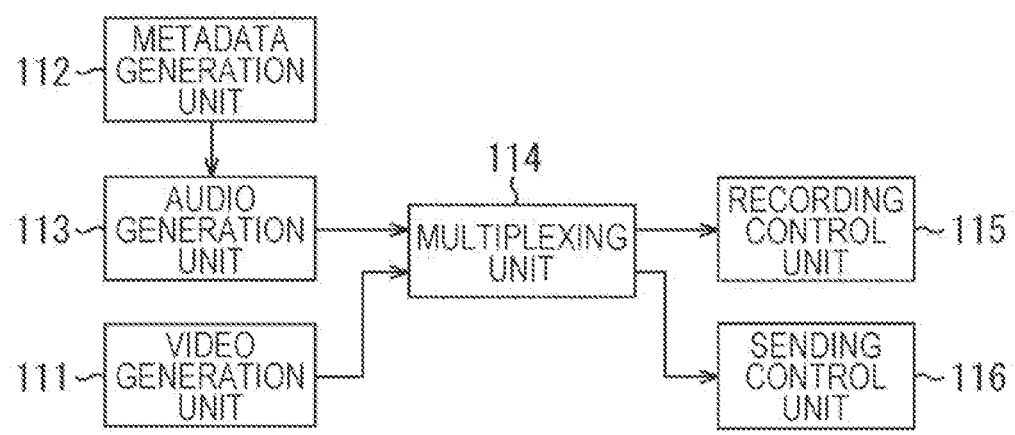
FIG. 22 is a block diagram showing a functional configuration example of a content generation apparatus.

FIG. 22 is a block diagram showing a functional configuration example of a content generation apparatus 101 that generates content such as an instructional video as described above.

The content generation apparatus 101 is, for example, an information processing apparatus manipulated by the content creator. The content generation apparatus 101 basically has the hardware configuration similar to that of the reproduction apparatus 1 shown in FIG. 7.

The following description will be given where the configuration shown in FIG. 7 is cited as appropriate for the configuration of the content generation apparatus 101. Each constituent shown in FIG. 22 is realized by executing a predetermined program with the CPU 11 (FIG. 7) of the content generation apparatus 101.

As shown in FIG. 22, the content generation apparatus 101 is constituted by a video generation unit 111, a metadata generation unit 112, an audio generation unit 113, a multiplexing unit 114, a recording control unit 115, and a sending control unit 116.

The video generation unit 111 acquires picture signals inputted from the outside and generates video data by encoding the multi-viewpoint picture signals with a predetermined encoding method. The video generation unit 111 outputs the generated video data to the multiplexing unit 114.

The metadata generation unit 112 generates rendering parameters for each audio object for each viewpoint in accordance with the manipulation of the content creator. The metadata generation unit 112 outputs the generated rendering parameters to the audio generation unit 113.

Furthermore, the metadata generation unit 112 generates viewpoint information, which is information regarding the viewpoints of the content, in accordance with the manipulation of the content creator and outputs the viewpoint information to the audio generation unit 113.

The audio generation unit 113 acquires audio signals inputted from the outside and generates waveform data of each audio object. The audio generation unit 113 generates object-based audio data by associating the waveform data of each audio object with the rendering parameters generated by the metadata generation unit 112.

The audio generation unit 113 outputs the generated object-based audio data together with the viewpoint information to the multiplexing unit 114.

The multiplexing unit 114 multiplexes the video data supplied from the video generation unit 111 and the audio data supplied from the audio generation unit 113 by a predetermined method such as MPEG-H and generates the content. The audio data constituting the content also include the viewpoint information. The multiplexing unit 114 functions as a generating unit that generates the content including the object-based audio data.

In a case where the content is provided via the recording medium, the multiplexing unit 114 outputs the generated content to the recording control unit 115. In a case where the content is provided via the network, the multiplexing unit 114 outputs the generated content to the sending control unit 116.

The recording control unit 115 controls the drive 21 and records the content supplied from the multiplexing unit 114 on the removable medium 22. The removable medium 22 on which the content is recorded by the recording control unit 115 is provided to the reproduction apparatus 1.

The sending control unit 116 controls the communication unit 20 and sends the content supplied from the multiplexing unit 114 to the reproduction apparatus 1.

Figure 23:
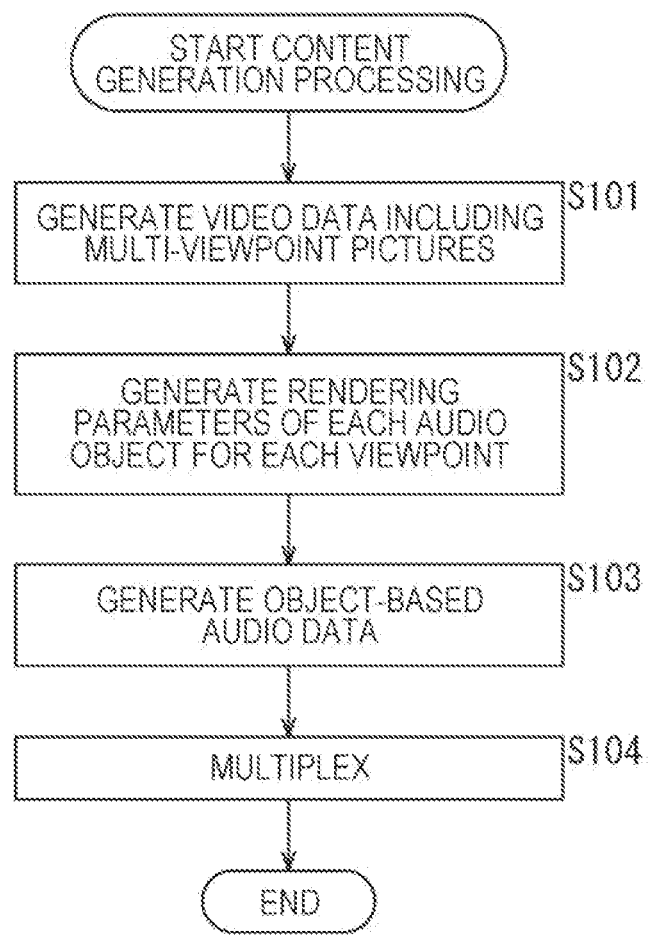
FIG. 23 is a flowchart for explaining the content generation processing of the content generation apparatus.

Here, with reference to the flowchart in FIG. 23, the content generation processing of the content generation apparatus 101 having the above configuration will be described.

In step S101, the video generation unit 111 acquires the picture signals inputted from the outside and generates the video data including the multi-viewpoint picture signals.

In step S102, the metadata generation unit 112 generates the rendering parameters of each audio object for each viewpoint in accordance with the manipulation of the content creator.

In step S103, the audio generation unit 113 acquires the audio signals inputted from the outside and generates the waveform data of each audio object. The audio generation unit 113 also generates the object-based audio data by associating the waveform data of each audio object with the rendering parameters generated by the metadata generation unit 112.

In step S104, the multiplexing unit 114 multiplexes the video data generated by the video generation unit 111 and the audio data generated by the audio generation unit 113 and generates the content.

The content generated by the above processing is provided to the reproduction apparatus 1 via a predetermined route and reproduced in the reproduction apparatus 1.

<7. Modification Examples>

The content reproduced by the reproduction apparatus 1 includes the video data and the object-based audio data, but the content may be constituted by the object-based audio data without including the video data. In a case where a predetermined listening position is selected from among listening positions for which rendering parameters are prepared, each audio object is reproduced by using the rendering parameters for the selected listening position.

The rendering parameters are determined by the content creator hereinbefore, but may be determined by the user herself/himself who views the content. Furthermore, the rendering parameters for each viewpoint determined by the user himself/herself may be provided to other users via the Internet or the like.

By the rendering reproduction using the rendering parameters provided in this way, the sounds intended by a different user are reproduced. Note that the content creator may be able to limit the types and values of the parameters that can be set by the user.

In each of the above-described embodiments, it is possible to combine two or more of the embodiments as appropriate to be used. For example, in the case where an audio object, of which the localized position is not desired to be changed, can be designated as described with reference to FIG. 11, an audio object required for the reproduction may be able to be designated as described with reference to FIG. 12.

Second Embodiment

<1. Configuration Example of Distribution System>

Figure 24:
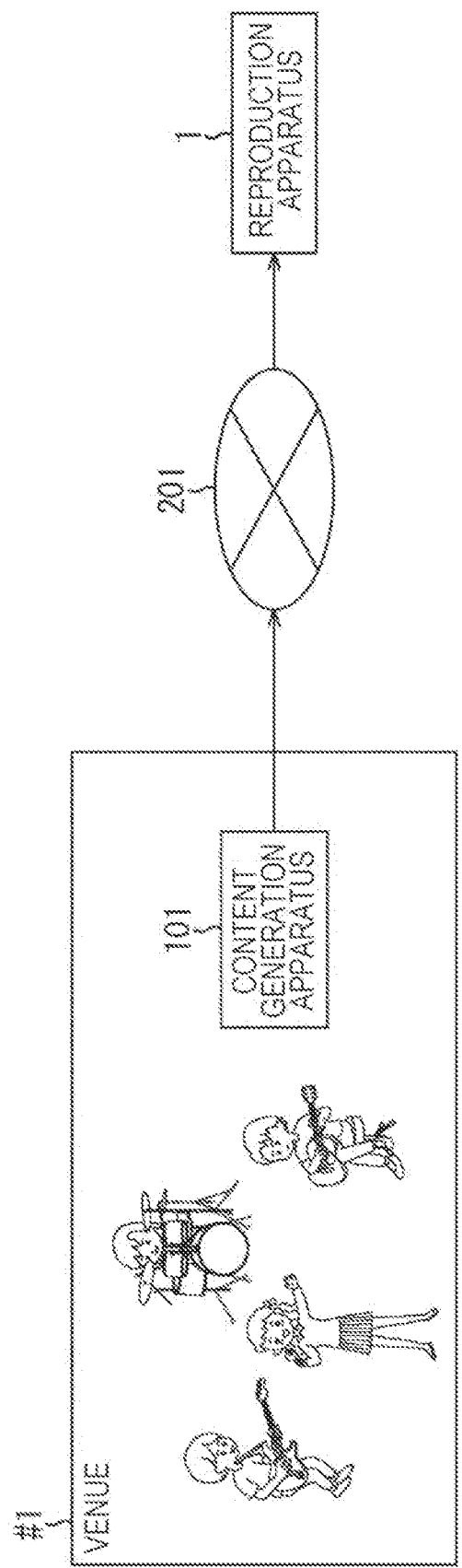
FIG. 24 is a diagram showing a configuration example of a distribution system.

FIG. 24 is a diagram showing a configuration example of a distribution system that distributes content including the object audio as described above for which the rendering parameters are prepared for each viewpoint.

In the distribution system in FIG. 24, a content generation apparatus 101 managed by a content creator is placed at a venue #1 where a music live show is being held. Meanwhile, a reproduction apparatus 1 is placed at the user's home. The reproduction apparatus 1 and the content generation apparatus 101 are connected via the Internet 201.

The content generation apparatus 101 generates content constituted by video data including multi-viewpoint pictures and object audio including rendering parameters for a plurality of respective viewpoints. The content generated by the content generation apparatus 101 is sent to, for example, a server (not shown) and provided to the reproduction apparatus 1 via the server.

The reproduction apparatus 1 receives the content sent from the content generation apparatus 101 and reproduces the video data for the viewpoint selected by the user. Furthermore, the reproduction apparatus 1 renders the object audio by using the rendering parameters for the viewpoint selected by the user and outputs the sounds of the music live show.

For example, the content generation apparatus 101 generates and sends the content in real time following the progress of the music live show. The user of the reproduction apparatus 1 can remotely view the music live show substantially in real time.

In the example in FIG. 24, only the reproduction apparatus 1 is shown as a reproduction apparatus that receives the distributed content, but in reality many reproduction apparatuses are connected to the Internet 201.

The user of the reproduction apparatus 1 can freely select an arbitrary viewpoint and hear the object audio. In a case where the rendering parameters for the viewpoint selected by the user are not sent from the content generation apparatus 101, the reproduction apparatus 1 generates rendering parameters for the selected viewpoint and renders the object audio.

The rendering parameters are generated by linear interpolation in the aforementioned example, but are generated in the reproduction apparatus 1 in FIG. 24 by using a parameter estimator constituted by a neural network. The reproduction apparatus 1 has the parameter estimator generated by learning by using the audio data of the music live shows held at the venue #1. The generation of the rendering parameters by using the parameter estimator will be described later.

Figure 25:
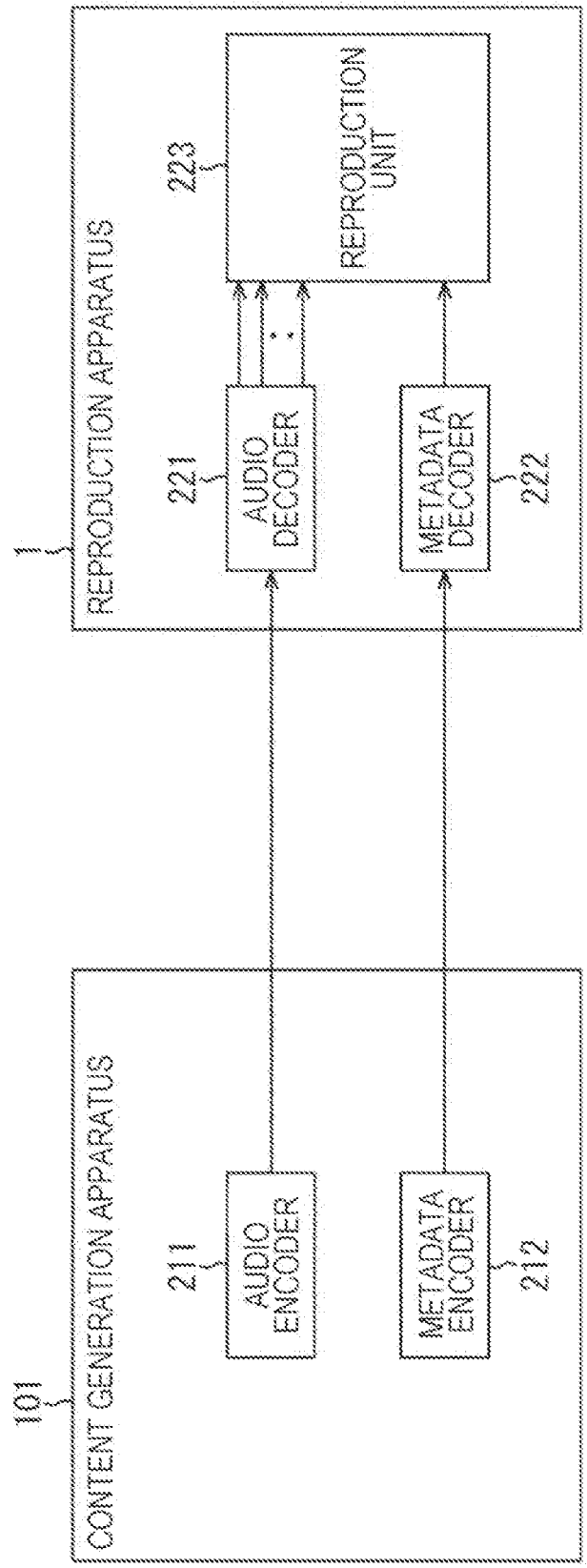
FIG. 25 is a block diagram showing configuration examples of the reproduction apparatus and the content generation apparatus.

FIG. 25 is a block diagram showing configuration examples of the reproduction apparatus 1 and the content generation apparatus 101.

FIG. 25 shows only part of the configurations of the reproduction apparatus 1 and the content generation apparatus 101, but the reproduction apparatus 1 has the configuration shown in FIG. 8. Furthermore, the content generation apparatus 101 has the configuration shown in FIG. 22.

The content generation apparatus 101 has an audio encoder 211 and a metadata encoder 212. The audio encoder 211 corresponds to the audio generation unit 113 (FIG. 22), and the metadata encoder 212 corresponds to the metadata generation unit 112.

The audio encoder 211 acquires audio signals during the music live show and generates waveform data of each audio object.

The metadata encoder 212 generates rendering parameters of each audio object for each viewpoint in accordance with the manipulation of the content creator.

The audio generation unit 113 associates the waveform data generated by the audio encoder 211 with the rendering parameters generated by the metadata encoder 212 so that the object-based audio data is generated. The object-based audio data is multiplexed with the video data in a multiplexing unit 114 and then sent to the reproduction apparatus 1 by a sending control unit 116.

The reproduction apparatus 1 has an audio decoder 221, a metadata decoder 222, and a reproduction unit 223. The audio decoder 221, the metadata decoder 222, and the reproduction unit 223 constitute an audio reproduction unit 33 (FIG. 8). In a content acquisition unit 31 of the reproduction apparatus 1, the content sent from the content generation apparatus 101 is acquired, and the object-based audio data and video data are separated by a separation unit 32.

The object-based audio data is inputted into the audio decoder 221. Furthermore, the rendering parameters for each viewpoint are inputted into the metadata decoder 222.

The audio decoder 221 decodes the audio data and outputs the waveform data of each audio object to the reproduction unit 223.

The metadata decoder 222 outputs the rendering parameters for the viewpoint selected by the user to the reproduction unit 223.

The reproduction unit 223 renders the waveform data of each audio object in accordance with the rendering parameters supplied from the metadata decoder 222 and causes a speaker to output the sound corresponding to the audio signal of each channel.

In a case where the interposed constituents are omitted and not shown, the waveform data of each audio object generated by the audio encoder 211 is supplied to the audio decoder 221 as shown in FIG. 25. Furthermore, the rendering parameters generated by the metadata encoder 212 are supplied to the metadata decoder 222.

Figure 26:
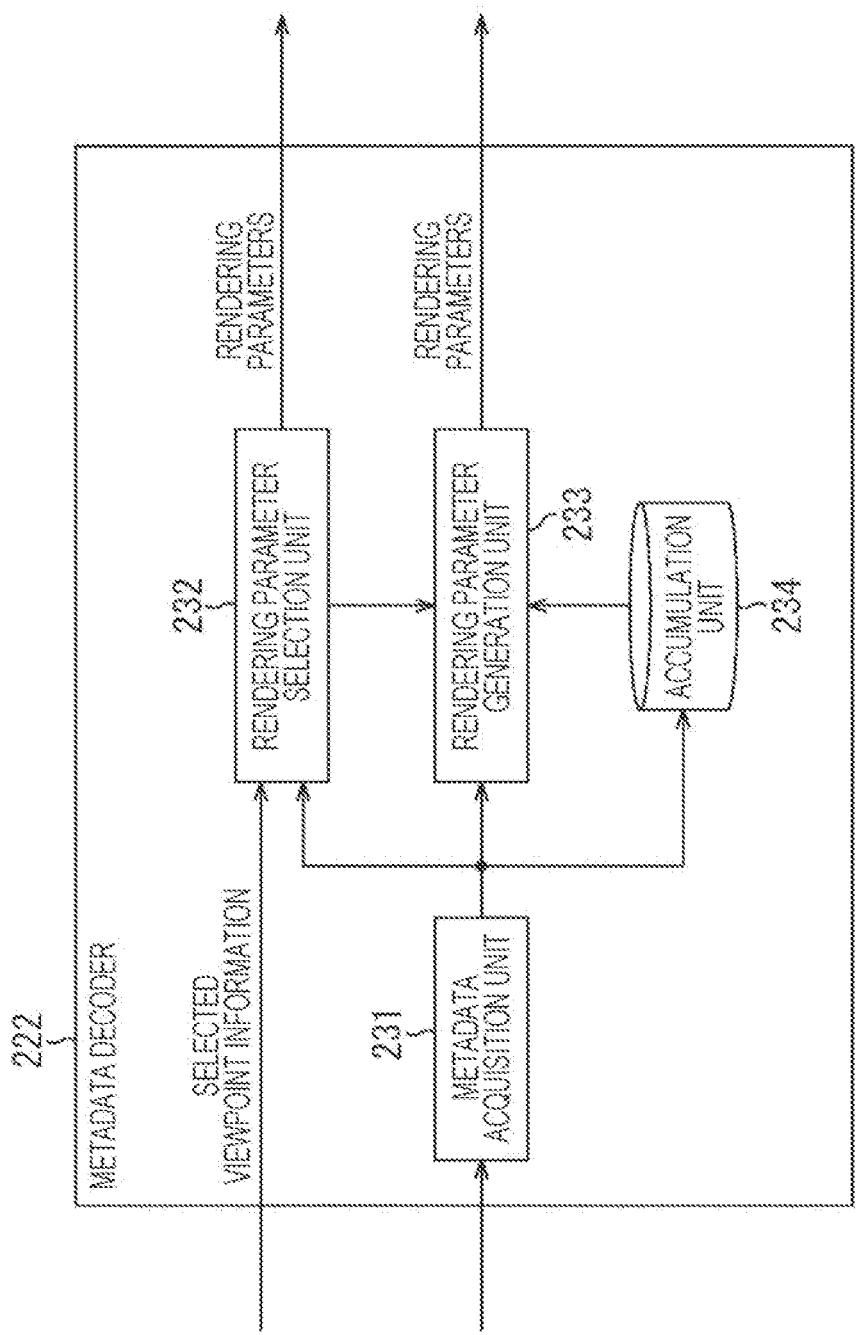
FIG. 26 is a block diagram showing a configuration example of the metadata decoder.

FIG. 26 is a block diagram showing a configuration example of the metadata decoder 222.

As shown in FIG. 26, the metadata decoder 222 is constituted by a metadata acquisition unit 231, a rendering parameter selection unit 232, a rendering parameter generation unit 233, and an accumulation unit 234.

The metadata acquisition unit 231 receives and acquires the rendering parameters for each viewpoint sent in a form of being included in the audio data. The rendering parameters acquired by the metadata acquisition unit 231 are supplied to the rendering parameter selection unit 232, the rendering parameter generation unit 233, and the accumulation unit 234.

The rendering parameter selection unit 232 identifies, on the basis of selected viewpoint information inputted, the viewpoint selected by the user. In a case where the rendering parameters for the viewpoint selected by the user are present in the rendering parameters supplied from the metadata acquisition unit 231, the rendering parameter selection unit 232 outputs the rendering parameters for the viewpoint selected by the user.

Furthermore, in a case where the rendering parameters for the viewpoint selected by the user are not present, the rendering parameter selection unit 232 outputs the selected viewpoint information to the rendering parameter generation unit 233 and causes the rendering parameter generation unit 233 to generate the rendering parameters.

The rendering parameter generation unit 233 has a parameter estimator. The rendering parameter generation unit 233 uses the parameter estimator to generate the rendering parameters for the viewpoint selected by the user. To generate the rendering parameters, the current rendering parameters supplied from the metadata acquisition unit 231 and the past rendering parameters read out from the accumulation unit 234 are used as input into the parameter estimator. The rendering parameter generation unit 233 outputs the generated rendering parameters. The rendering parameters generated by the rendering parameter generation unit 233 correspond to the aforementioned pseudo-rendering parameters.

Thus, the rendering parameters are generated by the rendering parameter generation unit 233 by using also the rendering parameters sent in the past from the content generation apparatus 101. For example, in a case where a music live show is held every day at the venue #1 and the content thereof is distributed every day, rendering parameters are sent every day from the content generation apparatus 101 (the metadata encoder 212).

Figure 27:
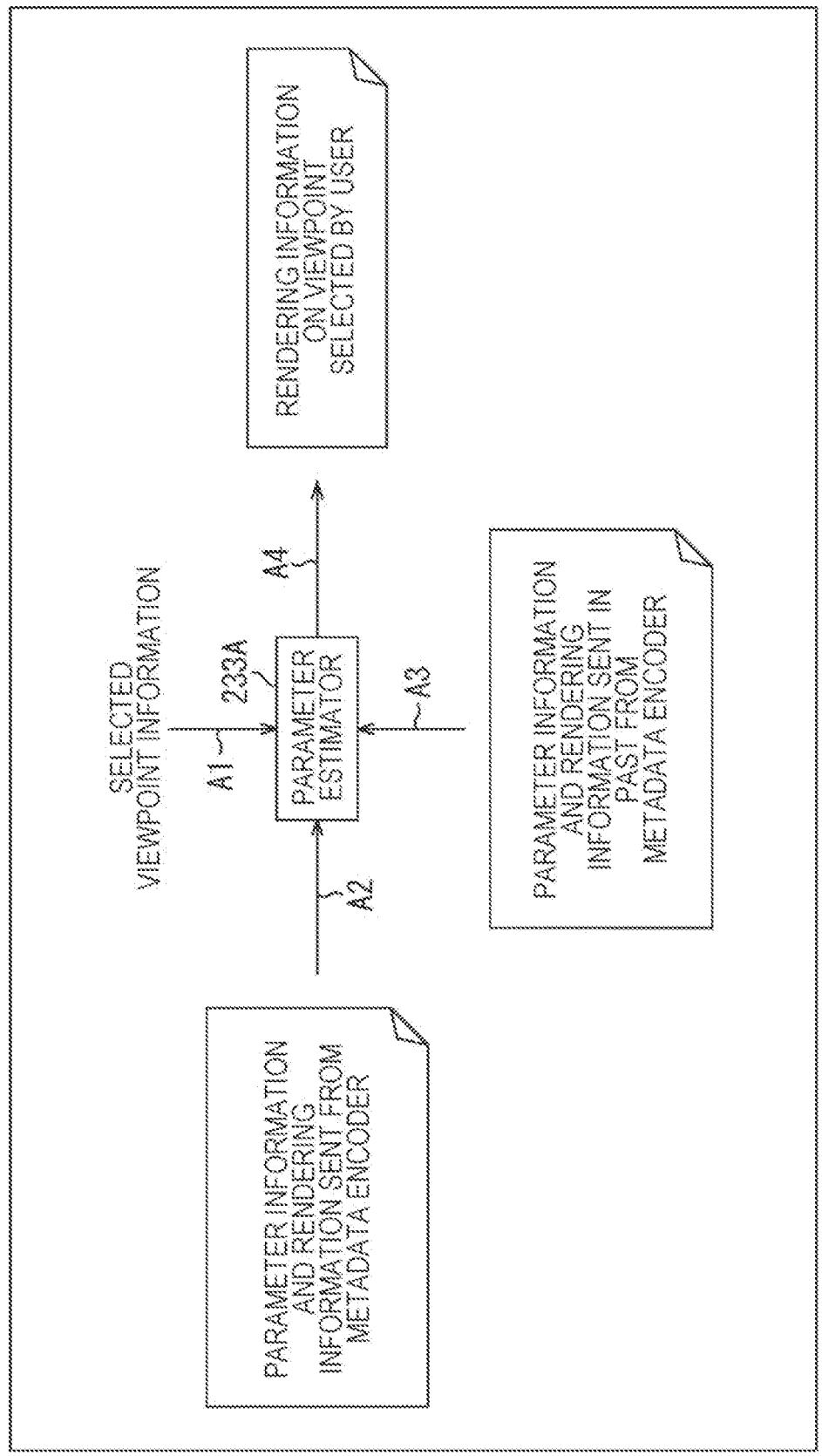
FIG. 27 is a diagram showing examples of input and output of the parameter estimator.

FIG. 27 is a diagram showing examples of input and output of the parameter estimator possessed by the rendering parameter generation unit 233.

As indicated by arrows A1 to A3, in addition to the information regarding the viewpoint selected by the user, the current (latest) rendering parameters and the past rendering parameters sent from the metadata encoder 212 are inputted into a parameter estimator 233A.

Here, the rendering parameters include parameter information and rendering information. The parameter information is information including information indicating the types of the audio objects, positional information of the audio objects, viewpoint position information, and information regarding the date and time. Meanwhile, the rendering information is information regarding the characteristics of the waveform data such as gains. The details of the information constituting the rendering parameters will be described later.

In a case where such each piece of information is inputted, the parameter estimator 233A outputs the rendering information of the viewpoint selected by the user as indicated by an arrow A4.

The rendering parameter generation unit 233 performs the learning of the parameter estimator 233A as appropriate by using the rendering parameters sent from the metadata encoder 212. The learning of the parameter estimator 233A is performed at a predetermined timing such as when a new rendering parameter is sent.

The accumulation unit 234 stores the rendering parameters supplied from the metadata acquisition unit 231. The accumulation unit 234 accumulates the rendering parameters sent from the metadata encoder 212.

<2. Example of Generating Rendering Parameters>

Here, the generation of the rendering parameters by the rendering parameter generation unit 233 will be described.

(1) Suppose there are a plurality of audio objects.
The audio data of the objects are defined as below.

$$x(n,i) i=0,1,2,\ldots,L-1$$

n is a time index. Furthermore, i represents the type of the object. Here, the number of objects is L.

(2) Suppose there are a plurality of viewpoints.
The rendering information of the objects for each viewpoint is defined as below.

$$r(i,j) j=0,1,2,\ldots,M-1$$

j represents the type of the viewpoint. The number of viewpoints is M.

(3) The audio data y(n, j) for each viewpoint is expressed by the following expression (1).

[Mathematical 1]

$$y(n, j) = \sum_{i=0}^{L-1} x(n, i) * r(i, j) \quad (1)$$

Here, suppose that rendering information r is a gain (gain information). In this case, the value of the rendering information r ranges from 0 to 1. The audio data for each viewpoint are expressed by multiplying the audio data of each object by the gain and adding the audio data of all the objects. The calculation as shown in the expression (1) is performed by the reproduction unit 223.

(4) In a case where the viewpoint designated by the user is not any of the viewpoints of j=0, 1, 2, . . . , M−1, the rendering parameters for the viewpoint designated by the user are generated by using the past rendering parameters and the current rendering parameters.

(5) The rendering information of the objects for each viewpoint is defined below with the type of the object, the position of the object, the position of the viewpoint, and the time.

r(obj_type, obj_loc_x, obj_loc_y, obj_loc_z, lis_loc_x, lis_loc_y, lis_loc_z, date_time)

obj_type is information indicating the type of the object and indicates, for example, the type of the musical instrument.

obj_loc_x, obj_loc_y, and obj_loc_z are information indicating the position of the object in the three-dimensional space.

lis_loc_x, lis_loc_y, and lis_loc_z are information indicating the position of the viewpoint in the three-dimensional space.

date_time is information representing the date and time at which the performance was performed.

From the metadata encoder 212, such parameter information constituted by obj_type, obj_loc_x, obj_loc_y, obj_loc_z, lis_loc_x, lis_loc_y, lis_loc_z, and date_time is sent together with the rendering information r.

This will be specifically described hereinafter.

Figure 28:
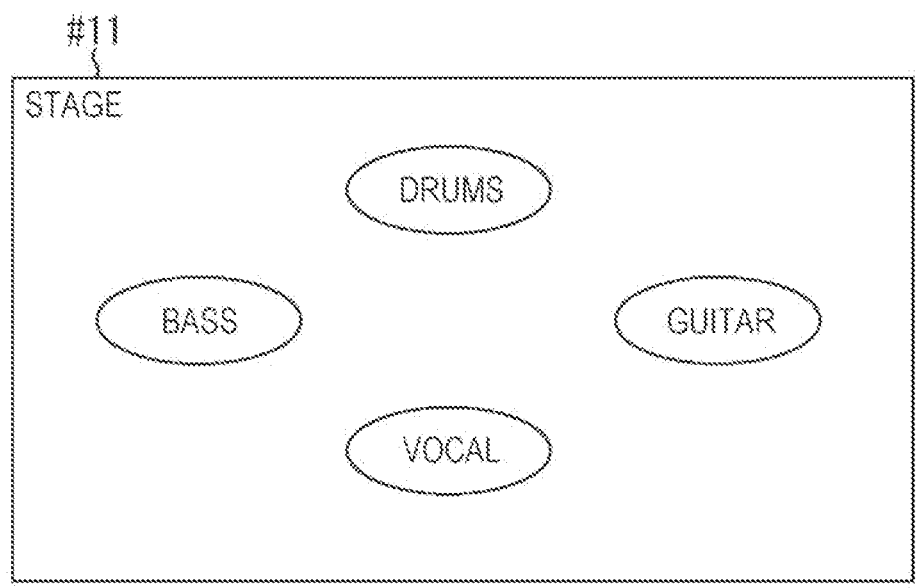
FIG. 28 is a view showing an arrangement example of each object.

(6) For example, each object of the bass, the drums, the guitar, and the vocal is arranged as shown in FIG. 28. FIG. 28 is a view of a stage #11 in a venue #1 seen from directly above.

Figure 29:
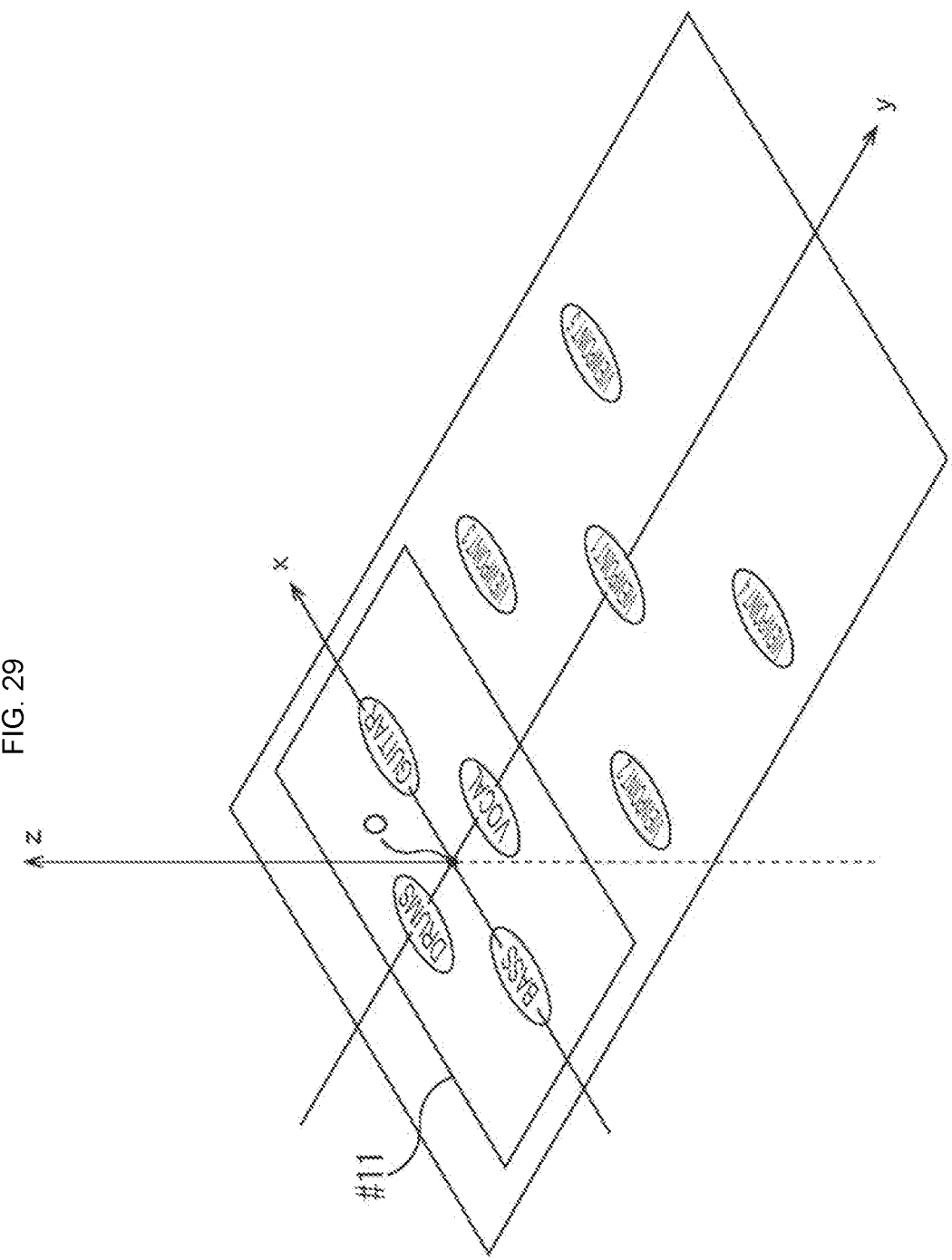
FIG. 29 is a view of a venue seen from an oblique direction.

(7) For the venue #1, the respective axes of XYZ are set as shown in FIG. 29. FIG. 29 is a view of the entire venue #1 including the stage #11 and audience seats seen from an oblique direction. The origin 0 is the center position on the stage #11. Viewpoints 1 to 5 are set at the audience seats.

The coordinates of each object are expressed as below. The unit is meters.

Coordinates of Bass: x=−20, y=0, z=0
Coordinates of Drums: x=0, y=−10, z=0
Coordinates of Guitar: x=20, y=0, z=0
Coordinates of Vocal: x=0, y=10, z=0

(8) The coordinates of each viewpoint are expressed as below.

Viewpoint 2: x=−20, y=30, z=−1
Viewpoint 3: x=20, y=30, z=−1
Viewpoint 4: x=−20, y=70, z=−1
Viewpoint 5: x=20, y=70, z=−1

(9) At this time, for example, the rendering information of each object for the viewpoint 1 is expressed as below.

Rendering Information of Bass
:r(0, −20, 0, 0, 0, 50, −1, 2014.11.5.18.34.50)
Rendering Information of Drums
:r(1, 0, −10, 0, 0, 50, −1, 2014.11.5.18.34.50)
Rendering Information of Guitar
:r(2, 20, 0, 0, 0, 50, −1, 2014.11.5.18.34.50)
Rendering Information of Vocal
:r(3, 0, 10, 0, 0, 50, −1, 2014.11.5.18.34.50)

The date and time when the music live show was held are at 18:34:50 on Nov. 5, 2014. Furthermore, obj_type of each object has the following value.
Bass: obj_type=0
Drums: obj_type=1
Guitar: obj_type=2
Vocal: obj_type=3

For each viewpoint of the viewpoints 1 to 5, the metadata encoder 212 sends the rendering parameters including the parameter information and the rendering information expressed as described above. The rendering parameters for each viewpoint of the viewpoints 1 to 5 are shown in FIGS. 30 and 31.

(10) At this time, from the aforementioned expression (1), the audio data in a case where the viewpoint 1 is selected is expressed by the following expression (2).

[Mathematical 2]

$$y(n,1)=x(n,0)*r(0,-20,0,0,0,50,-1,\\
2014.11.5.18.34.50)+x(n,1)*r(1,0,-10,0,0,50,-1,\\
2014.11.5.18.34.50)+x(n,2)*r(2,20,0,0,0,50,-1,\\
2014.11.5.18.34.50)+x(n,3)*r(3,0,10,0,0,50,-1,\\
2014.11.5.18.34.50) \quad (2)$$

However, as for x(n, i), i represents the following objects.
i=0: Object of Bass
i=1: Object of Drums
i=2: Object of Guitar
i=3: Object of Vocal

Figure 32:
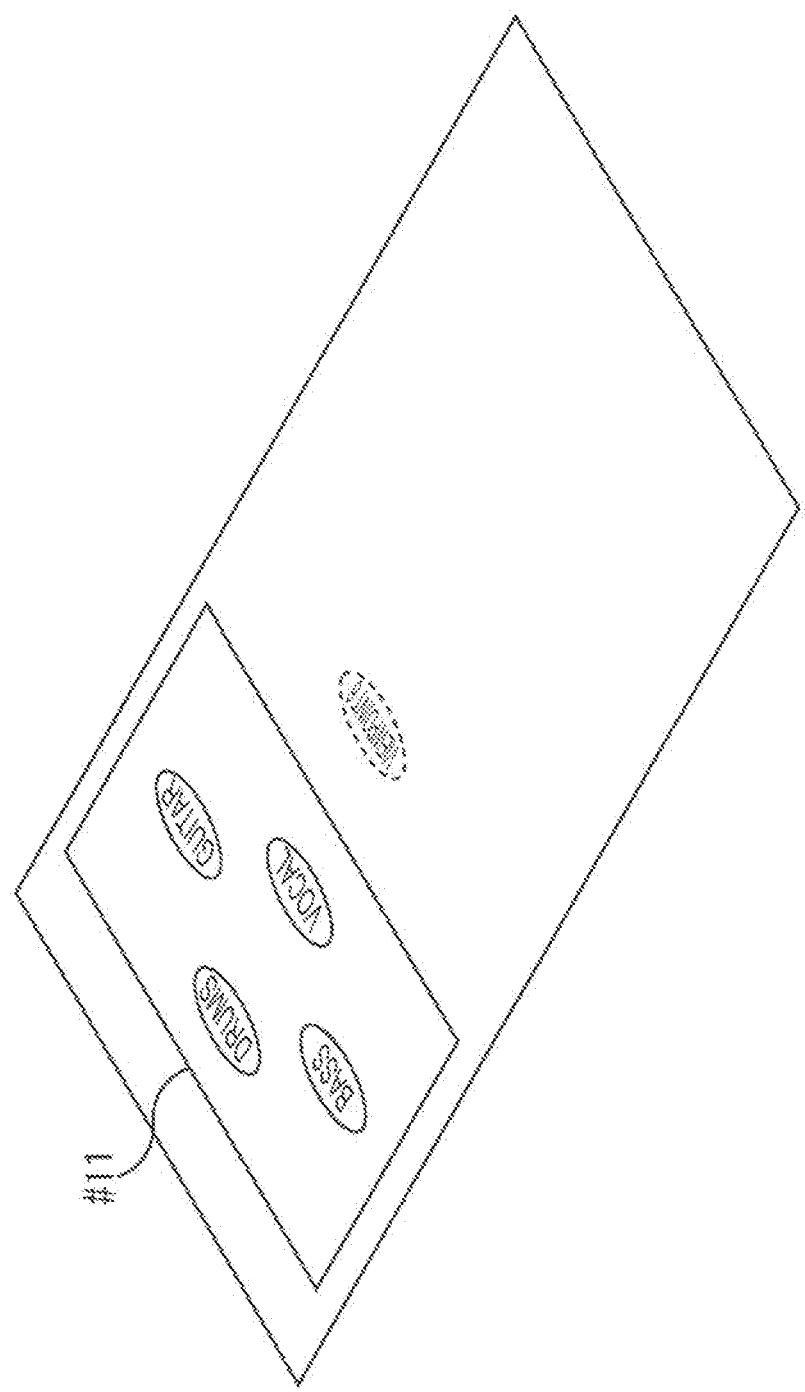
FIG. 32 is a view showing the position of the viewpoint 6.

(11) A viewpoint 6 indicated by a broken line in FIG. 32 is designated by the user as a viewing position. Rendering parameters for the viewpoint 6 are not sent from the metadata encoder 212. The coordinates of the viewpoint 6 are expressed as below.
Viewpoint 6: x=0, y=30, z=−1

In this case, the rendering parameters for the current viewpoint 6 are generated by using the current (2014.11.5.18.34.50) rendering parameters for the viewpoints 1 to 5 and the rendering parameters for the near viewpoints sent in the past (before 2014.11.5.18.34.50). The past rendering parameters are read out from the accumulation unit 234.

Figure 33:
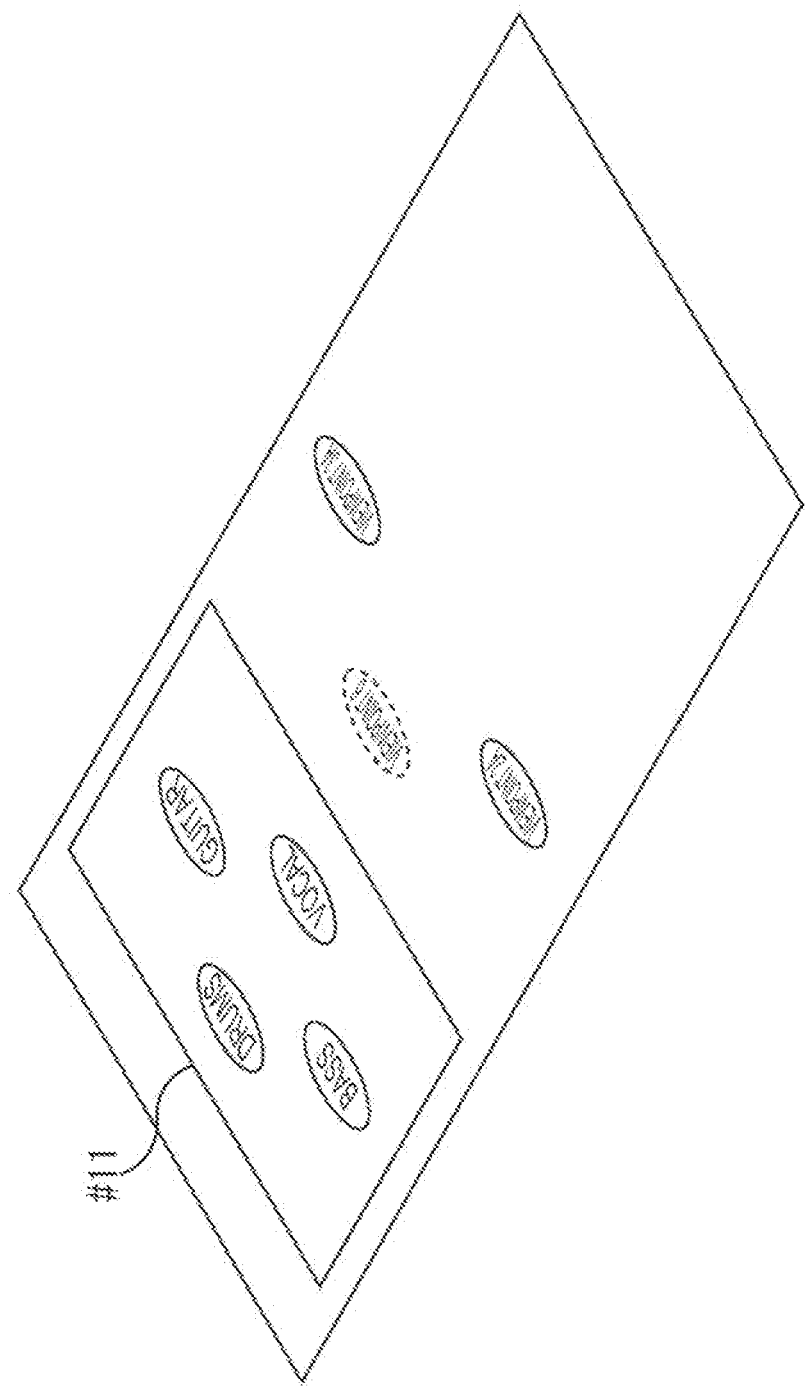
FIG. 33 is a view showing the positions of the viewpoint 2A and the viewpoint 3A.

(12) For example, rendering parameters for a viewpoint 2A and a viewpoint 3A shown in FIG. 33 were sent in the past. The viewpoint 2A is positioned between the viewpoint 2 and the viewpoint 4, and the viewpoint 3A is positioned between the viewpoint 3 and the viewpoint 5. The coordinates of the viewpoint 2A and the viewpoint 3A are expressed as below.
Viewpoint 2A: x=−20, y=40, z=−1
Viewpoint 3A: x=20, y=40, z=−1

The rendering parameters for each viewpoint of the viewpoints 2A and 3A are shown in FIG. 34. In FIG. 34, obj_type of each object also has the following value.
Bass: obj_type=0
Drums: obj_type=1
Guitar: obj_type=2
Vocal: obj_type=3

Thus, the position of the viewpoint for which the rendering parameters are sent from the metadata encoder 212 is not always a fixed position, but is a different position at that time. The accumulation unit 234 stores the rendering parameters for viewpoints at various positions in the venue #1.

Note that the configuration and position of each object of the bass, the drums, the guitar, and the vocal are desired to be the same in the current rendering parameters and the past rendering parameter used for the estimation, but may be different.

(13) Estimation method for the rendering information for the viewpoint 6 The following information is inputted into the parameter estimator 233A.

Parameter information and rendering information for the viewpoints 1 to 5 (FIGS. 30 and 31)
Parameter information and rendering information for the viewpoints 2A and 3A (FIG. 34)
Parameter information for the viewpoint 6 (FIG. 35)

In FIG. 35, lis_loc_x, lis_loc_y, and lis_loc_z represent the position of the viewpoint 6 selected by the user. Furthermore, as data_time, 2014.11.5.18.34.50 representing the current date and time is used.

The parameter information for the viewpoint 6 used as the input into the parameter estimator 233A is generated by the rendering parameter generation unit 233, for example, on the basis of the parameter information for the viewpoints 1 to 5 and the position of the viewpoint selected by the user.

In a case where such each piece of information is inputted, the parameter estimator 233A outputs the rendering information of each object for the viewpoint 6 as shown in the right end column in FIG. 35.
Rendering Information of Bass (obj_type=0)
:r(0, −20, 0, 0, 0, 30, −1, 2014.11.5.18.34.50)
Rendering Information of Drums (obj_type=1)
:r(1, 0, −10, 0, 0, 30, −1, 2014.11.5.18.34.50)
Rendering Information of Guitar (obj_type=2)
:r(2, 20, 0, 0, 0, 30, −1, 2014.11.5.18.34.50)
Rendering Information of Vocal (obj_type=3)
:r(3, 0, 10, 0, 0, 30, −1, 2014.11.5.18.34.50)

The rendering information outputted from the parameter estimator 233A is supplied together with the parameter information for the viewpoint 6 to the reproduction unit 223 and is used for the rendering. The parameter generation unit 233 thus generates and outputs the rendering parameters constituted by the parameter information for the viewpoint, for which rendering parameters are not prepared, and the rendering information estimated by using the parameter estimator 233A.

(14) Learning of parameter estimator 233A

The rendering parameter generation unit 233 performs the learning of the parameter estimator 233A by using the rendering parameters as learning data, which are sent from the metadata encoder 212 and accumulated in the accumulation unit 234.

In the learning of the parameter estimator 233A, the rendering information r sent from the metadata encoder 212 is used as teaching data. For example, the rendering parameter generation unit 233 performs the learning of the parameter estimator 233A by adjusting coefficients such that the error (r^-r) between the rendering information r and the output r^ of the neural network becomes small.

By performing the learning using the rendering parameters sent from the content generation apparatus 101, the parameter estimator 233A becomes an estimator for the venue #1, which is used to generate the rendering parameters when a predetermined position in the venue #1 is set as a viewpoint.

The rendering information r is a gain with a value from 0 to 1 hereinbefore, but may include equalizer information, compressor information, and reverb information as described with reference to FIG. 13. In other words, the rendering information r can be information representing at least any one of a gain, equalizer information, compressor information, or reverb information.

Furthermore, the parameter estimator 233A inputs each piece of information shown in FIG. 27, but may be simply configured as a neural network that outputs the rendering information r when the parameter information for the viewpoint 6 is inputted.

<3. Another Configuration Example of Distribution System>

Figure 36:
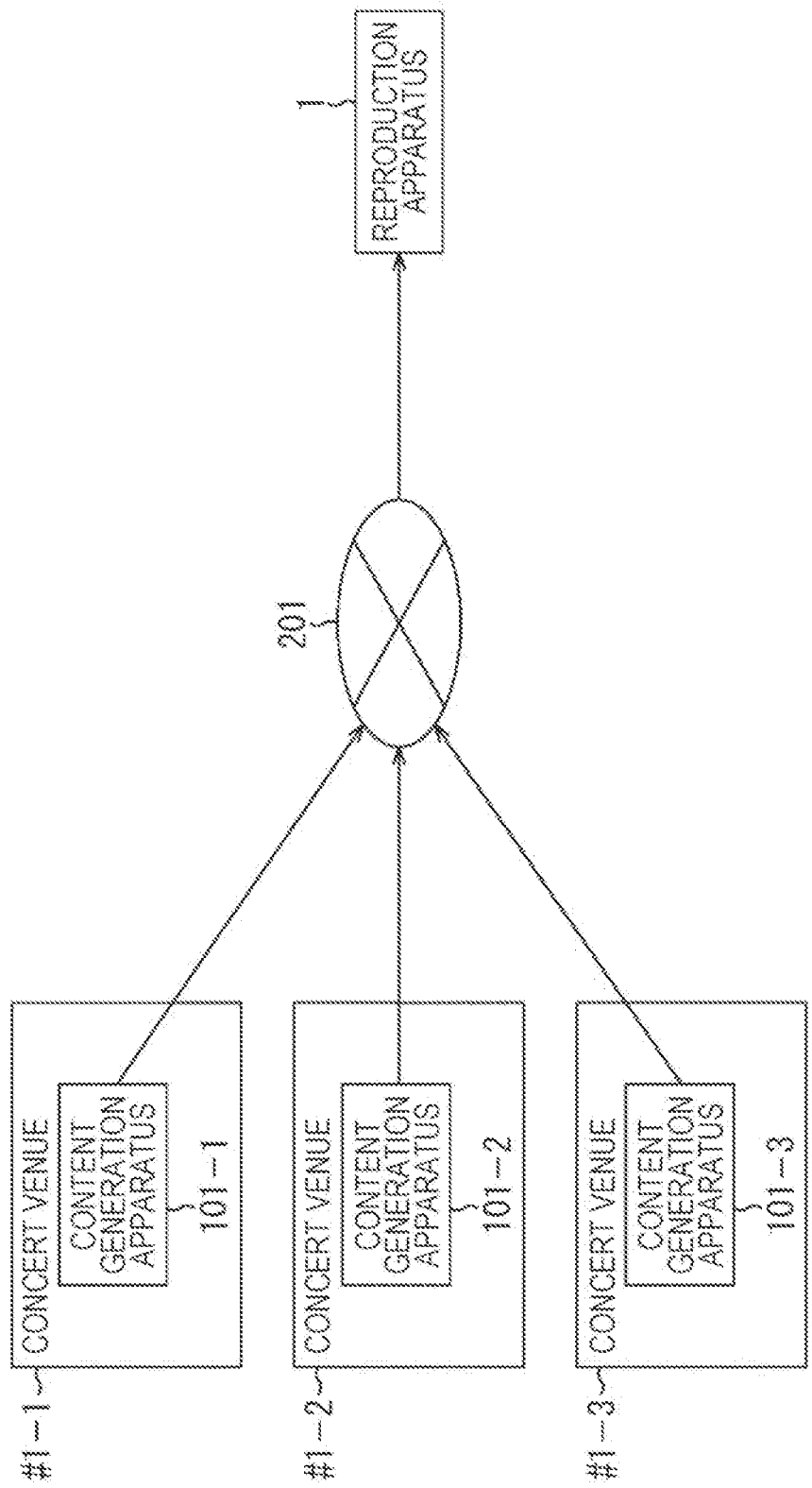
FIG. 36 is a diagram showing another configuration example of the distribution system.

FIG. 36 is a diagram showing another configuration example of the distribution system. Constituents the same as those described above are denoted by the same reference signs. Redundant descriptions will be omitted. This also applies to FIG. 37 and the subsequent drawings.

In the example in FIG. 36, there are venues #1-1 to #1-3 as venues where music live shows are being held. Content generation apparatuses 101-1 to 101-3 are placed at the venues #1-1 to #1-3, respectively. In a case where it is unnecessary to distinguish the content generation apparatuses 101-1 to 101-3, they are collectively referred to as a content generation apparatus 101.

Each of the content generation apparatuses 101-1 to 101-3 has a function similar to that of the content generation apparatus 101 in FIG. 24. In other words, the content generation apparatuses 101-1 to 101-3 distribute, via the Internet 201, contents containing the music live shows being held at the respective venues.

A reproduction apparatus 1 receives the content distributed by the content generation apparatus 101 placed at the venue where the music live show selected by the user is being held, reproduces the object-based audio data as described above, and the like. The user of the reproduction apparatus 1 can select a viewpoint and view the music live show being held at a predetermined venue.

The parameter estimator used to generate the rendering parameters is generated in the reproduction apparatus 1 in the aforementioned example, but is generated on the content generation apparatus 101 side in the example in FIG. 36.

In other words, the content generation apparatuses 101-1 to 101-3 generate the parameter estimators separately by using the past rendering parameters as learning data as previously mentioned, or the like.

The parameter estimator generated by the content generation apparatus 101-1 is a parameter estimator for the venue #1-1 compatible with the acoustic characteristics and each viewing position in the venue #1-1. The parameter estimator generated by the content generation apparatus 101-2 is a parameter estimator for the venue #1-2, and the parameter estimator generated by the content generation apparatus 101-3 is a parameter estimator for the venue #1-3.

For example, in a case of reproducing the content generated by the content generation apparatus 101-1, the reproduction apparatus 1 acquires the parameter estimator for the venue #1-1. In a case where the user selects a viewpoint for which rendering parameters are not prepared, the reproduction apparatus 1 inputs the current and past rendering parameters into the parameter estimator for the venue #1-1 and generates the rendering parameters as previously mentioned.

Thus, in the distribution system in FIG. 36, a parameter estimator for each venue is prepared on the content generation apparatus 101 side and provided to the reproduction apparatus 1. Since the rendering parameters for an arbitrary viewpoint are generated by using the parameter estimator for each venue, the user of the reproduction apparatus 1 can select an arbitrary viewpoint and view the music live show at each venue.

Figure 37:
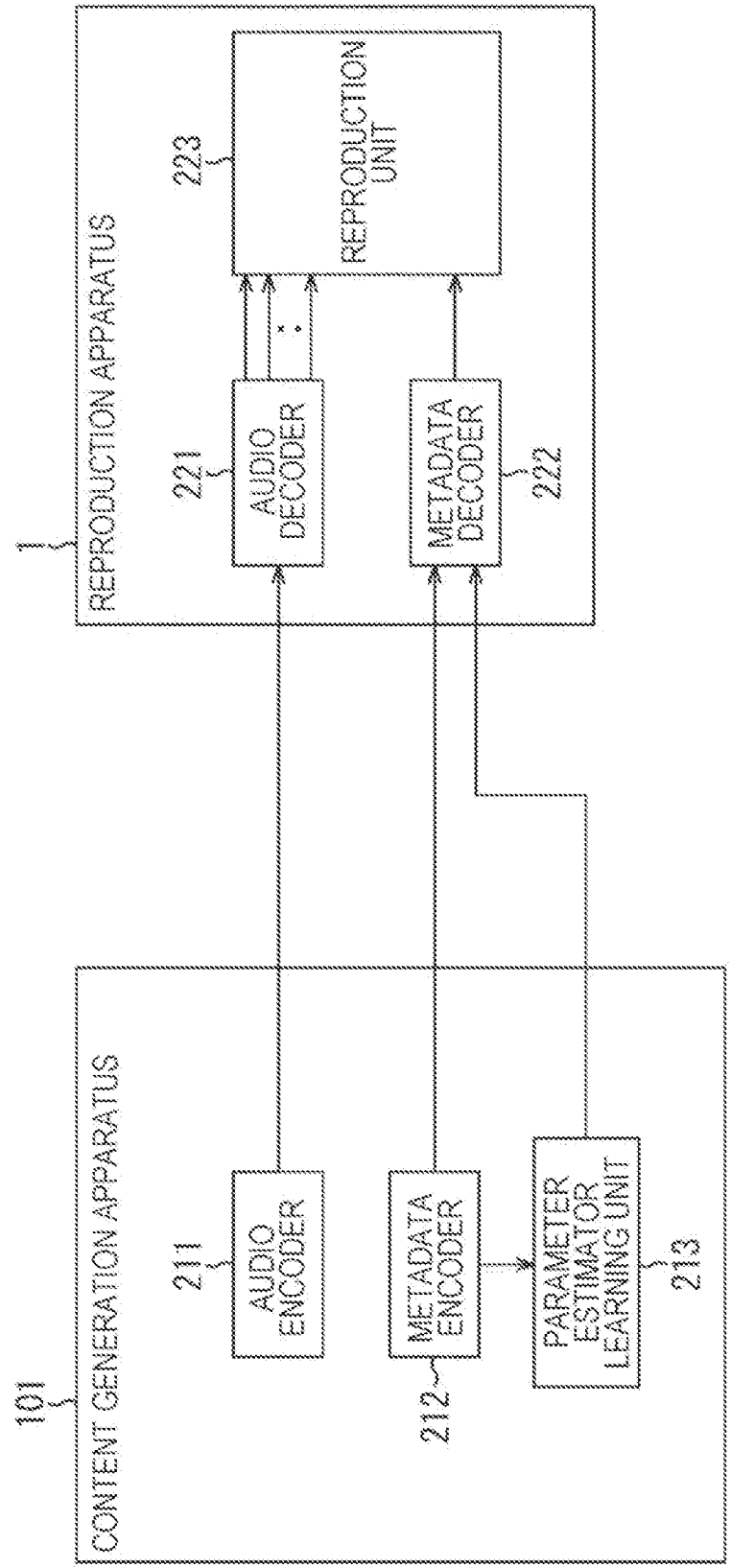
FIG. 37 is a block diagram showing configuration examples of the reproduction apparatus and the content generation apparatus.

FIG. 37 is a block diagram showing configuration examples of the reproduction apparatus 1 and the content generation apparatus 101.

The configuration of the content generation apparatus 101 shown in FIG. 37 is different from the configuration shown in FIG. 25 in that a parameter estimator learning unit 213 is provided. Each of the content generation apparatuses 101-1 to 101-3 shown in FIG. 36 has the configuration the same as the configuration of the content generation apparatus 101 shown in FIG. 37.

The parameter estimator learning unit 213 performs the learning of the parameter estimator by using the rendering parameters generated by a metadata encoder 212 as learning data. The parameter estimator learning unit 213 sends the parameter estimator to the reproduction apparatus 1 at a predetermined timing such as before the content is started to be distributed.

A metadata acquisition unit 231 of a metadata decoder 222 of the reproduction apparatus 1 receives and acquires the parameter estimator sent from the content generation apparatus 101. The metadata acquisition unit 231 functions as an acquisition unit that acquires a parameter estimator for the venue.

The parameter estimator acquired by the metadata acquisition unit 231 is set in a rendering parameter generation unit 233 of a metadata decoder 222 and used to generate the rendering parameters as appropriate.

Figure 38:
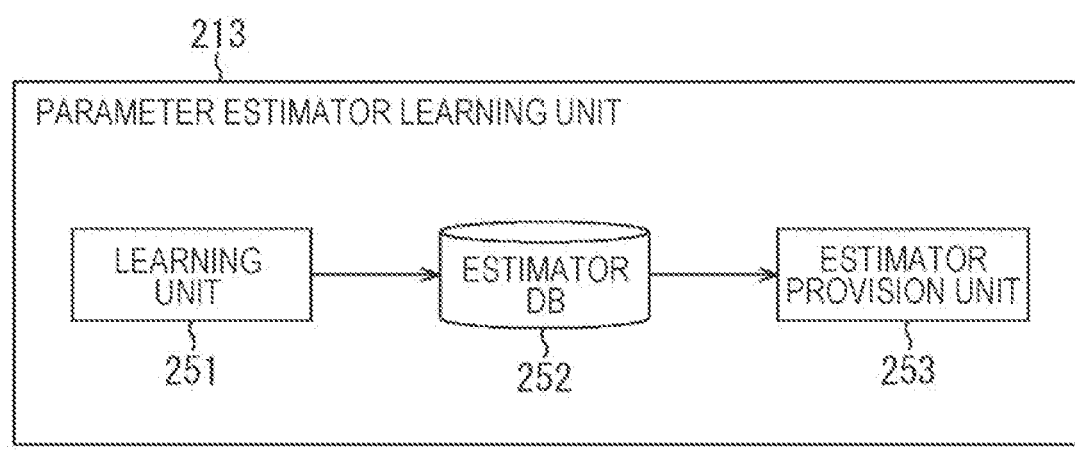
FIG. 38 is a block diagram showing a configuration example of the parameter estimator learning unit in FIG. 37.

FIG. 38 is a block diagram showing a configuration example of the parameter estimator learning unit 213 in FIG. 37.

The parameter estimator learning unit 213 is constituted by a learning unit 251, an estimator DB 252, and an estimator provision unit 253.

The learning unit 251 performs the learning of the parameter estimator stored in the estimator DB 252 by using the rendering parameters generated by the metadata encoder 212 as learning data.

The estimator provision unit 253 controls the sending control unit 116 (FIG. 22) to send the parameter estimator stored in the estimator DB 252 to the reproduction apparatus 1. The estimator provision unit 253 functions as a provision unit that provides the parameter estimator to the reproduction apparatus 1.

Thus, a parameter estimator for each venue can be prepared on the content generation apparatus 101 side and provided to the reproduction apparatus 1 at a predetermined timing such as before the content is started to be reproduced.

The parameter estimator for each venue is generated in the content generation apparatus 101 placed at each venue in the example in FIG. 36, but can be generated by a server connected to the Internet 201.

Figure 39:
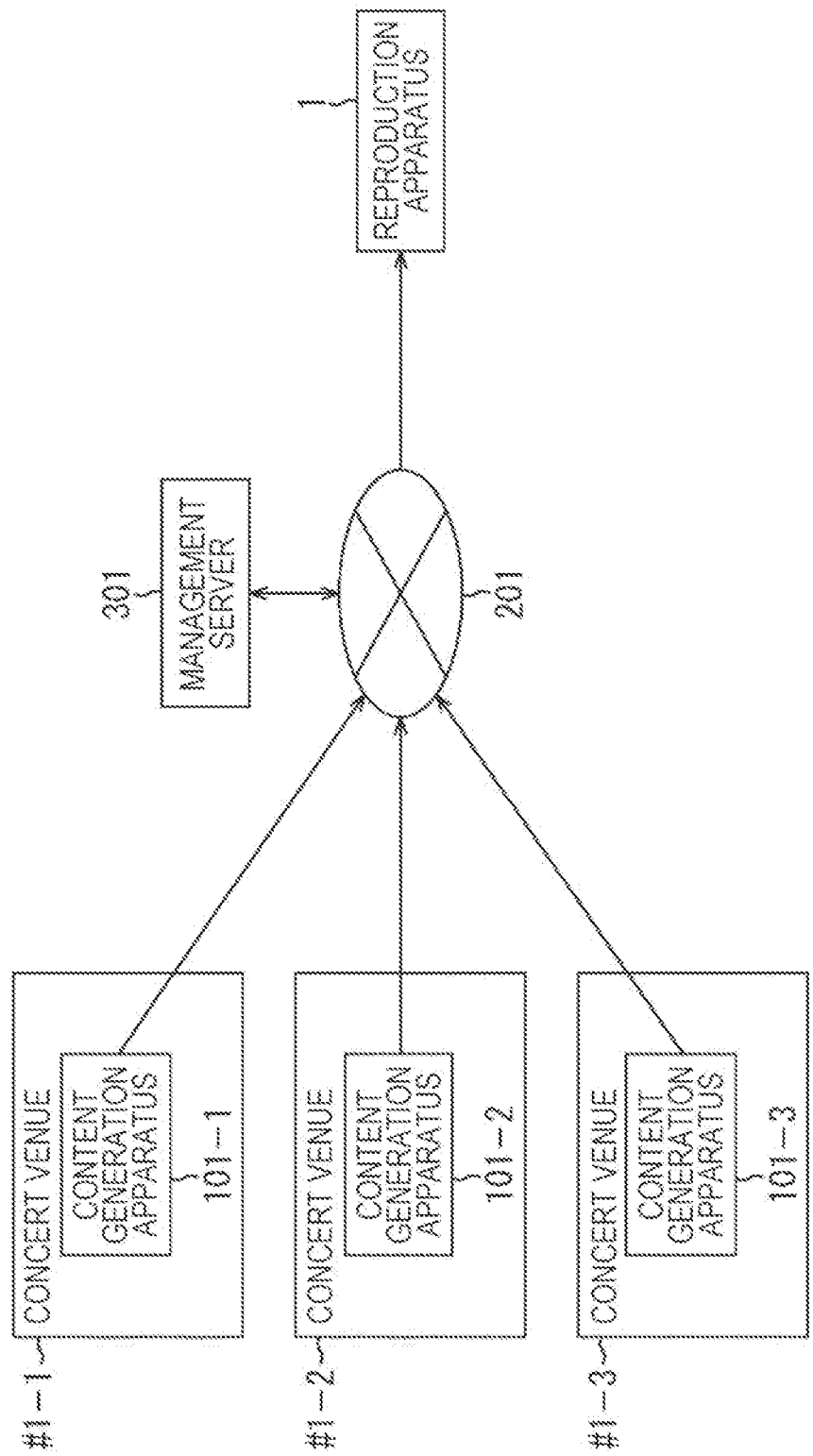
FIG. 39 is a block diagram showing still another configuration example of the distribution system.

FIG. 39 is a block diagram showing still another configuration example of the distribution system.

A management server 301 in FIG. 39 receives rendering parameters sent from content generation apparatuses 101-1 to 101-3 placed at venues #1-1 to #1-3 and learns parameter estimators for the respective venues. In other words, the management server 301 has a parameter estimator learning unit 213 in FIG. 38.

In a case where a reproduction apparatus 1 reproduces the content of a music live show at a predetermined venue, the management server 301 sends a parameter estimator for that venue to the reproduction apparatus 1. The reproduction apparatus 1 uses the parameter estimator sent from the management server 301 as appropriate to reproduce the audio.

Thus, the parameter estimator may be provided via the management server 301 connected to the Internet 201. Note that the learning of the parameter estimator may be performed on the content generation apparatus 101 side, and the generated parameter estimator may be provided to the management server 301.

Note that the embodiments of the present technology are not limited to the above embodiments, and various changes can be made in a scope without departing from the gist of the present technology.

For example, the present technology can adopt the configuration of cloud computing in which one function is shared and collaboratively processed by a plurality of apparatuses via a network.

Furthermore, each step described in the above-described flowcharts can be executed by one apparatus or can also be shared and executed by a plurality of apparatuses.

Moreover, in a case where a plurality of processings are included in one step, the plurality of processings included in the one step can be executed by one apparatus or can also be shared and executed by a plurality of apparatuses.

The effects described in the specification are merely examples and are not limited, and other effects may be exerted.

About Program

The series of processings described above can be executed by hardware or can be executed by software. In a case where the series of processings is executed by software, a program constituting the software is installed in a computer incorporated into dedicated hardware, a general-purpose personal computer, or the like.

The program to be installed is provided by being recorded on the removable medium 22 shown in FIG. 7, which is constituted by an optical disk (compact disc-read only memory (CD-ROM), a digital versatile disc (DVD), or the like), a semiconductor memory, or the like. Furthermore, the program may be provided via a wired or wireless transmission medium such as a local area network, the Internet, or digital satellite broadcasting. The program can also be installed in the ROM 12 and the storage unit 19 in advance.

Note that the program executed by the computer may be a program in which the processings are performed in time series according to the order described in the specification, or may be a program in which the processings are performed in parallel or at necessary timings such as when a call is made.

—About Combinations

The present technology can also adopt the following configurations.

(1)

A reproduction apparatus including:

an acquisition unit that acquires content including audio data of each of audio objects and rendering parameters of the audio data for each of a plurality of presumed listening positions; and a rendering unit that renders the audio data on the basis of the rendering parameters for a selected predetermined presumed listening position and outputs an audio signal.

(2)

The reproduction apparatus according to (1), in which the content further includes information regarding the presumed listening positions set in advance, and the reproduction apparatus further includes a display control unit that causes a screen used to select the presumed listening position to be displayed on the basis of the information regarding the presumed listening positions.

(3)

The reproduction apparatus according to (1) or (2), in which the rendering parameters for each of the presumed listening positions include localization information representing positions where the audio objects are localized and gain information which is a parameter for gain adjustment of the audio data.

(4)

The reproduction apparatus according to any one of (1) to (3), in which the rendering unit renders the audio data of an audio object selected as an audio object, of which a sound source position is fixed, on the basis of the rendering parameters different from the rendering parameters for the selected presumed listening position.

(5)

The reproduction apparatus according to any one of (1) to (4), in which the rendering unit does not render the audio data of a predetermined audio object among the plurality of the audio objects constituting sounds of the content.

(6)

The reproduction apparatus according to any one of (1) to (5), further including a generation unit that generates the rendering parameters of each of the audio objects for the presumed listening position, for which the rendering parameters are not prepared, on the basis of the rendering parameters for the presumed listening positions, in which the rendering unit renders the audio data of each of the audio objects by using the rendering parameters generated by the generation unit.

(7)

The reproduction apparatus according to (6), in which the generation unit generates the rendering parameters for the presumed listening position, for which the rendering parameters are not prepared, on the basis of the rendering parameters for the plurality of near presumed listening positions for which the rendering parameters are prepared.

(8)

The reproduction apparatus according to (6), in which the generation unit generates the rendering parameters for the presumed listening position, for which the rendering parameters are not prepared, on the basis of the rendering parameters included in the content acquired in past.

(9)

The reproduction apparatus according to (6), in which the generation unit generates the rendering parameters for the presumed listening position, for which the rendering parameters are not prepared, by using an estimator.

(10)

The reproduction apparatus according to (9), in which the acquisition unit acquires the estimator for a venue where the content is recorded, and the generation unit generates the rendering parameters by using the estimator acquired by the acquisition unit.

(11)

The reproduction apparatus according to (9) or (10), in which the estimator is constituted by learning by using the rendering parameters included at least in the content acquired in past.

(12)

The reproduction apparatus according to any one of (1) to (11), in which the content further includes video data used to display a picture from the presumed listening positions as viewpoint positions, and the reproduction apparatus further includes a video reproduction unit that reproduces the video data and causes the picture from the selected predetermined presumed listening position as a viewpoint position to be displayed.

(13)
A reproduction method including the steps of:
acquiring content including audio data of each of audio objects and rendering parameters of the audio data for each of a plurality of presumed listening positions; and
rendering the audio data on the basis of the rendering parameters for a selected predetermined presumed listening position, and outputting an audio signal.

(14)
A program that causes a computer to execute processing including the steps of:
acquiring content including audio data of each of audio objects and rendering parameters of the audio data for each of a plurality of presumed listening positions; and
rendering the audio data on the basis of the rendering parameters for a selected predetermined presumed listening position, and outputting an audio signal.

(15)
An information processing apparatus including:
a parameter generation unit that generates rendering parameters of audio data of each of audio objects for each of a plurality of presumed listening positions; and
a content generation unit that generates content including the audio data of each of the audio objects and the rendering parameters generated.

(16)
The information processing apparatus according to (15), in which the parameter generation unit further generates information regarding the presumed listening positions set in advance, and
the content generation unit generates the content further including the information regarding the presumed listening positions.

(17)
The information processing apparatus according to (15) or (16), further including a video generation unit that generates video data used to display a picture from the presumed listening positions as viewpoint positions,
in which the content generation unit generates the content further including the video data.

(18)
The information processing apparatus according to any one of (15) to (17), further including a learning unit that generates an estimator used to generate the rendering parameters when a position other than the plurality of the presumed listening positions, for which the rendering parameters are generated, is set as a listening position.

(19)
The information processing apparatus according (18), further including a provision unit that provides the estimator to a reproduction apparatus that reproduces the content.

(20)
An information processing method including the steps of:
generating rendering parameters of audio data of each of audio objects for each of a plurality of presumed listening positions; and
generating content including the audio data of each of the audio objects and the rendering parameters generated.

REFERENCE SIGNS LIST

1 Reproduction apparatus
33 Audio reproduction unit
51 Rendering parameter selection unit
52 Object data storage unit
53 Viewpoint information display unit
54 Rendering unit

The invention claimed is:

1. A reproduction apparatus, comprising:
circuitry configured to:
acquire, for each of a plurality of presumed listening positions, content including audio data of each of a plurality of audio objects and a first plurality of rendering parameters of the audio data of each of the plurality of audio objects, wherein the first plurality of rendering parameters of each of the plurality of audio objects includes a localized position of a respective audio object of the plurality of audio objects from each of the plurality of presumed listening positions; and
render the audio data of at least one of the plurality of audio objects for a specific presumed listening position by using vector based amplitude panning (VBAP), wherein
the audio data is rendered based on the first plurality of rendering parameters, and
the specific presumed listening position is associated with the plurality of presumed listening positions; and
output an audio signal based on the rendered audio data.

2. The reproduction apparatus according to claim 1, wherein
the content further includes information associated with the plurality of presumed listening positions set in advance, and
the circuitry is further configured to display a screen for selection of the specific presumed listening position based on the information.

3. The information processing device according to claim 1, wherein the first plurality of rendering parameters for each of the plurality of presumed listening positions further includes gain information which is a parameter for gain adjustment of the rendered audio data.

4. The reproduction apparatus according to claim 1, wherein
the circuitry does not render the audio data of a specific audio object among the plurality of the audio objects, and
the plurality of the audio objects is associated with sounds of the content.

5. The reproduction apparatus according to claim 1, wherein the circuitry is further configured to:
generate a second plurality of rendering parameters of each of the plurality of audio objects for the specific presumed listening position based on the first plurality of rendering parameters for the plurality of presumed listening positions, wherein the specific presumed listening position corresponds to a position for which the second plurality of rendering parameters are not prepared; and
render the audio data of each of the audio objects by using the rendering parameters generated by the generation unit.

6. The reproduction apparatus according to claim 5, wherein
the circuitry is further configured to generate the second plurality of rendering parameters for the specific presumed listening position based on the first plurality of rendering parameters for a set of presumed listening positions of the plurality of presumed listening positions, each of the set of presumed listening positions is in proximity to the specific presumed listening position, and each of the set of presumed listening positions is a position for which the first plurality of rendering parameters is prepared.

7. The reproduction apparatus according to claim 5, wherein the circuitry is further configured to:

acquire a third plurality of rendering parameters of each of the plurality of audio objects for each of the plurality of presumed listening positions, wherein the third plurality of rendering parameters of each of the plurality of audio objects is acquired before the first plurality of rendering parameters of each of the plurality of audio object is acquired; and generate the second plurality of rendering parameters based on the third plurality of rendering parameters.

8. The reproduction apparatus according to claim 1, wherein the circuitry is further configured to render audio data of a specific audio object of the plurality of audio object for the specific presumed listening position, the audio data of the specific audio object is rendered based on a second plurality of rendering parameters of the specific audio object, the second plurality of rendering parameters is different from the first plurality of rendering parameters, the plurality of presumed listening positions includes the specific presumed listening position, and a sound source position of the specific audio object is fixed based on the plurality of presumed listening positions.

9. The reproduction apparatus according to claim 1, wherein the content further includes video data, from the plurality of presumed listening positions, associated with a picture, the plurality of presumed listening positions is a plurality of viewpoint positions, and the circuitry is further configured to:

reproduce the video data from the specific presumed listening position, wherein the specific presumed listening position is a viewpoint position of the plurality of viewpoint positions; and display the picture based on the reproduced video data.

10. A reproduction method, comprising:

acquiring, for each of a plurality of presumed listening positions, content including audio data of each of a plurality of audio objects and a plurality of rendering parameters of the audio data of each of the plurality of audio objects, wherein the plurality of rendering parameters of each of the plurality of audio objects includes a localized position of a respective audio object of the plurality of audio objects from each of the plurality of presumed listening positions;

rendering the audio data of at least one of the plurality of audio objects for a specific presumed listening position by using vector based amplitude panning (VBAP), wherein the audio data is rendered based on the plurality of rendering parameters for at least one of the plurality of presumed listening positions, and the specific presumed listening position is associated with the plurality of presumed listening positions; and outputting an audio signal based on the rendered audio data.

11. A non-transitory computer-readable medium having stored thereon computer-executable instructions which, when executed by a processor, cause the processor to execute operations, the operations comprising:

acquiring, for each of a plurality of presumed listening positions, content including audio data of each of a plurality of audio objects and a plurality of rendering parameters of the audio data of each of the plurality of audio objects, wherein the plurality of rendering parameters of each of the plurality of audio objects includes a localized position of a respective audio object of the plurality of audio objects from each of the plurality of presumed listening positions;

rendering the audio data of at least one of the plurality of audio objects for a specific presumed listening position by using vector based amplitude panning (VBAP), wherein the audio data is rendered based on the plurality of rendering parameters for at least one of the plurality of presumed listening positions, and the specific presumed listening position is associated with the plurality of presumed listening positions; and outputting an audio signal based on the rendered audio data.

* * * * *